United States Patent
Rugeland et al.

(10) Patent No.: US 12,356,270 B2
(45) Date of Patent: Jul. 8, 2025

(54) HANDLING OF STORED CONDITIONAL CONFIGURATION IN A WIRELESS COMMUNICATION NETWORK

(71) Applicant: Telefonaktiebolaget LM Ericsson (publ), Stockholm (SE)

(72) Inventors: Patrik Rugeland, Bromma (SE); Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 476 days.

(21) Appl. No.: 17/765,705

(22) PCT Filed: Oct. 1, 2020

(86) PCT No.: PCT/SE2020/050928
§ 371 (c)(1),
(2) Date: Mar. 31, 2022

(87) PCT Pub. No.: WO2021/066723
PCT Pub. Date: Apr. 8, 2021

(65) Prior Publication Data
US 2022/0386207 A1  Dec. 1, 2022

Related U.S. Application Data

(60) Provisional application No. 62/910,433, filed on Oct. 3, 2019.

(51) Int. Cl.
*H04W 36/30* (2009.01)
*H04W 36/00* (2009.01)
*H04W 36/36* (2009.01)

(52) U.S. Cl.
CPC ....... *H04W 36/305* (2018.08); *H04W 36/362* (2023.05); *H04W 36/00698* (2023.05)

(58) Field of Classification Search
CPC ....... H04W 36/0069; H04W 36/00698; H04W 36/305; H04W 36/362; H04W 76/15; H04W 76/19
See application file for complete search history.

(56) References Cited

U.S. PATENT DOCUMENTS 11,483,889 B2 * 10/2022 Kim ................ H04W 76/19
11,503,514 B2 * 11/2022 Wu ................. H04W 24/10
(Continued)

FOREIGN PATENT DOCUMENTS

AU  2020379572 A1 * 7/2021 ........ H04W 36/0069
CN  108924866 A  11/2018
(Continued)

OTHER PUBLICATIONS

ZTE et al., Discussion on conditional PSCell addition/change, Aug. 17, 2020, 3GPP TSG-RAN WG2 Meeting #111 Electronic, Agenda Item: 8.2.3, Tdoc: R2-2006901 (Year: 2020).*
(Continued)

*Primary Examiner* — Eric Nowlin
(74) *Attorney, Agent, or Firm* — Murphy, Bilak & Homiller, PLLC

(57) ABSTRACT

A method is performed by a wireless device (18). The method comprises detecting a failure associated with a cell group in multi-connectivity operation. The method also comprises, responsive to detecting the failure, suspending monitoring of one or more trigger conditions whose fulfillment is to trigger execution of a conditional configuration (16) stored at the wireless device (18).

30 Claims, 29 Drawing Sheets

(56) References Cited

U.S. PATENT DOCUMENTS

| | | | |
|---|---|---|---|
| 11,924,697 B2* | 3/2024 | Xu | H04W 36/0069 |
| 12,003,983 B2* | 6/2024 | Lee | H04W 74/0833 |
| 2020/0154326 A1* | 5/2020 | Deenoo | H04W 74/0833 |
| 2020/0305216 A1* | 9/2020 | Kim | H04W 76/19 |
| 2021/0014746 A1* | 1/2021 | Wu | H04W 36/0058 |
| 2021/0099926 A1* | 4/2021 | Chen | H04W 36/00698 |
| 2021/0127447 A1* | 4/2021 | Zhang | H04W 80/02 |
| 2022/0038929 A1* | 2/2022 | Tsuboi | H04W 76/15 |
| 2022/0053598 A1* | 2/2022 | Peng | H04W 36/00698 |
| 2022/0110180 A1* | 4/2022 | Jung | H04W 24/10 |
| 2022/0124568 A1* | 4/2022 | Wu | H04W 88/02 |
| 2022/0159483 A1* | 5/2022 | Lee | H04W 24/04 |
| 2022/0256368 A1* | 8/2022 | Futaki | H04W 24/04 |
| 2022/0369173 A1* | 11/2022 | Deng | H04W 76/27 |
| 2022/0377629 A1* | 11/2022 | Rugeland | H04W 36/0079 |
| 2022/0386195 A1* | 12/2022 | Ishii | H04W 36/0069 |
| 2022/0386207 A1* | 12/2022 | Rugeland | H04W 76/15 |
| 2022/0394583 A1* | 12/2022 | Deenoo | H04W 24/08 |
| 2022/0394584 A1* | 12/2022 | Ishii | H04W 76/19 |
| 2023/0189110 A1* | 6/2023 | Wu | H04W 36/30 370/331 |
| 2023/0189112 A1* | 6/2023 | Wu | H04W 36/0069 455/437 |
| 2024/0397404 A1* | 11/2024 | Teyeb | H04W 36/305 |

FOREIGN PATENT DOCUMENTS

| | | | | |
|---|---|---|---|---|
| CN | 110169192 A | | 8/2019 | |
| CN | 110278574 A | * | 9/2019 | H04W 24/02 |
| CN | 110278574 B | * | 6/2021 | H04W 24/02 |
| CN | 113286318 A | * | 8/2021 | H04W 24/02 |
| CN | 114365531 A | * | 4/2022 | H04W 24/04 |
| CN | 114451011 A | * | 5/2022 | H04W 36/0038 |
| CN | 114631396 A | * | 6/2022 | H04W 24/08 |
| CN | 115552963 A | * | 12/2022 | H04W 36/0016 |
| CN | 115669069 A | * | 1/2023 | H04W 24/08 |
| CN | 113286318 B | * | 12/2023 | H04W 24/02 |
| EP | 3767991 A1 | * | 1/2021 | H04W 24/02 |
| EP | 4007346 A1 | * | 6/2022 | H04W 24/04 |
| EP | 4271042 A1 | * | 11/2023 | H04W 36/00692 |
| EP | 4351271 A2 | * | 4/2024 | H04W 36/0016 |
| JP | 2021520166 A | * | 8/2021 | |
| JP | 7071547 B2 | * | 5/2022 | H04W 24/02 |
| JP | 102403626 B1 | * | 5/2022 | |
| JP | 2022550176 A | * | 11/2022 | |
| JP | 7270752 B2 | * | 5/2023 | H04L 1/1812 |
| JP | 2023535123 A | * | 8/2023 | |
| JP | 7392721 B2 | * | 12/2023 | H04W 24/04 |
| KR | 20190139848 A | * | 12/2019 | |
| KR | 20200125659 A | * | 11/2020 | |
| KR | 20210100208 A | * | 8/2021 | |
| KR | 20230010730 A | * | 5/2023 | |
| KR | 102611966 B1 | * | 12/2023 | |
| TW | 202127953 A | * | 7/2021 | |
| WO | 2018156696 A1 | | 8/2018 | |
| WO | WO-2018175721 A1 | * | 9/2018 | H04W 24/08 |
| WO | WO-2019174446 A1 | * | 9/2019 | |
| WO | WO-2020197214 A1 | * | 10/2020 | |
| WO | WO-2020197306 A1 | * | 10/2020 | |
| WO | WO-2021066018 A1 | * | 4/2021 | |
| WO | WO-2021067236 A1 | * | 4/2021 | |
| WO | WO-2021091629 A1 | * | 5/2021 | |
| WO | WO-2021226836 A1 | * | 11/2021 | |
| WO | WO-2024033820 A1 | * | 2/2024 | H04W 76/18 |
| WO | WO-2024073039 A1 | * | 4/2024 | H04W 76/18 |
| WO | WO-2024073748 A1 | * | 4/2024 | H04W 76/18 |
| WO | WO-2024206914 A1 | * | 10/2024 | H04W 56/0045 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.7.0, Sep. 2019, 1-962.

3GPP, "3rd Generation Partnership Project; Technical Specification Group Radio Access Network; NR; Radio Resource Control (RRC) protocol specification (Release 15)", 3GPP TS 38.331 V15.7.0, Sep. 2019, 1-527.

Rapporteur (Ericsson), "Running CR for 38.331 for CA&DC enh", 3GPP TSG-RAN WG2 Meeting #107, R2-1911763, (revision of R2-1910238), Prague, Czech Republic, Aug. 26-30, 2019, 1-45.

Spreadtrum Communications, "PSCell conditional change considerations", R2-1912242, 3GPP TSG-RAN WG2 Meeting #107bis, Chongqing, China, Oct. 14-18, 2019.

* cited by examiner

HANDLING OF STORED CONDITIONAL CONFIGURATION IN A WIRELESS COMMUNICATION NETWORK

TECHNICAL FIELD

The present application relates generally to a wireless communication network, and relates more particularly to the handling of a stored conditional configuration in such a network.

BACKGROUND

Robustness of mobility procedures to failure proves challenging particularly in New Radio (NR) systems whose radio links are more prone to fast fading due to their higher operating frequencies. Conditional mobility is one approach to improve mobility robustness in this regard. Under this approach, a wireless device may be commanded to perform a mobility procedure (e.g., handover or resume) earlier than traditionally commanded, before the source radio link quality deteriorates below a certain threshold. But the wireless device is commanded to wait to perform that mobility procedure until the wireless device detects that a certain condition is fulfilled, e.g., the source radio link quality deteriorates even further below a different threshold. Once the device detects that condition, the device may autonomously perform the mobility procedure without receiving any other signaling on the source radio link, so that the procedure proves robust to source link deterioration.

These and other types of conditional configurations nonetheless threaten to increase signaling overhead, delay mobility, and/or trigger unnecessary procedures. For example, this may be the case where a conditional configuration concerns multi-connectivity (e.g., dual connectivity).

SUMMARY

Some embodiments herein concern how a wireless device is to handle a stored conditional configuration upon failure detection, e.g., secondary cell group (SCG) failure or master cell group (MCG) failure in multi-connectivity operation. In some embodiments, the wireless device deletes or releases at least a part of the stored conditional configuration upon failure detection. A network node (e.g., a secondary node or a master node) may correspondingly operate on the assumption that the wireless device deletes or releases at least a part of the stored conditional configuration upon failure detection. This way, no mismatch occurs between the wireless device and the network.

In other embodiments, by contrast, the wireless device continues to store (i.e., maintains) at least a part of the stored conditional configuration upon failure detection. A network node (e.g., a secondary node or a master node) may correspondingly operate on the assumption that the wireless device keeps or maintains at least a part of the stored conditional configuration upon failure detection. This way, no mismatch occurs between the wireless device and the network. Moreover, the network node in some embodiments performs delta signaling relative to the kept or maintained part(s) of the conditional configuration, e.g., so as to reduce signaling overhead.

More particularly, embodiments herein include a method performed by a wireless device. The method comprises detecting a failure associated with a cell group in multi-connectivity operation. The method also comprises, responsive to detecting the failure, suspending monitoring of one or more trigger conditions whose fulfillment is to trigger execution of a conditional configuration stored at the wireless device.

In some embodiments, the conditional configuration is a conditional PSCell change, CPC, configuration that conditionally configures a change to a PSCell for said multi-connectivity operation, wherein a PSCell is a primary cell of a secondary cell group included in multiple cell groups that are respectively provided by multiple radio network nodes to which the wireless device simultaneously connects in said multi-connectivity operation.

In some embodiments, the cell group is a secondary cell group, SCG, included in multiple cell groups that are respectively provided by multiple radio network nodes to which the wireless device simultaneously connects in said multi-connectivity operation, and wherein the failure is a SCG failure.

In some embodiments, the failure is detected upon either detecting radio link failure for the cell group, reconfiguration with sync failure of the cell group, cell group configuration failure, or integrity check failure associated with the cell group.

In some embodiments, suspending monitoring of one or more trigger conditions responsive to detecting the failure comprises, responsive to detecting the failure, initiating a procedure to report the failure. upon initiating the procedure to report the failure, suspending monitoring of the one or more trigger conditions whose fulfillment is to trigger execution of the conditional configuration stored at the wireless device. Suspending monitoring of one or more trigger conditions responsive to detecting the failure also comprises upon initiating the procedure to report the failure, suspending monitoring of the one or more trigger conditions whose fulfillment is to trigger execution of the conditional configuration stored at the wireless device.

In some embodiments, the method also comprises responsive to detecting the failure, keeping at least part of the conditional configuration stored at the wireless device unless and until the wireless device receives a command to release the conditional configuration.

In some embodiments, the method also comprises reporting the detected failure. The method also comprises, after reporting the detected failure, receiving a message from a network node. The method also comprises, based on receipt of the message, resuming monitoring of the one or more trigger conditions whose fulfillment is to trigger execution of the conditional configuration stored at the wireless device. Resuming monitoring of the one or more trigger conditions is performed if the message does not indicate the conditional configuration is to be released.

In some embodiments, the method also comprises reporting the detected failure. The method also comprises, responsive to reporting the detected failure, receiving delta signaling that configures the wireless device relative to the conditional configuration stored at the wireless device.

In some embodiments, the conditional configuration is a conditional PCell change configuration that conditionally configures a change to a PCell for said multi-connectivity operation. A PCell is a primary cell of a master cell group included in multiple cell groups that are respectively provided by multiple radio network nodes to which the wireless device simultaneously connects in said multi-connectivity operation.

In some embodiments, the conditional configuration is a conditional handover configuration.

In some embodiments, the cell group is a master cell group, CCG, included in multiple cell groups that are respectively provided by multiple radio network nodes to which the wireless device simultaneously connects in said multi-connectivity operation, and with the failure being a MCG failure.

Embodiments herein also include a method performed by a secondary radio network node that provides a secondary cell group for a wireless device in multi-connectivity operation. The method comprises configuring the wireless device with a conditional configuration. The method also comprises, after configuring the wireless device with the conditional configuration, receiving, from the wireless device, a report of a failure associated with a cell group in multi-connectivity operation. The method also comprises, after receiving the report, transferring, to a master radio network node that provides a master cell group for the wireless device in multi-connectivity operation, a context for the wireless device that includes the conditional configuration.

In some embodiments, the conditional configuration is a conditional PSCell change configuration that conditionally configures a change to a PSCell for said multi-connectivity operation. A PSCell is a primary cell of the secondary cell group included in multiple cell groups that are respectively provided by multiple radio network nodes to which the wireless device simultaneously connects in said multi-connectivity operation.

In some embodiments, the conditional configuration is a conditional PCell change configuration that conditionally configures a change to a PCell for said multi-connectivity operation. A PCell is a primary cell of the master cell group included in multiple cell groups that are respectively provided by multiple radio network nodes to which the wireless device simultaneously connects in said multi-connectivity operation.

In some embodiments, the cell group is the secondary cell group, SCG, with the failure being a SCG failure.

In some embodiments, the conditional configuration is a conditional handover configuration.

In some embodiments, the cell group is the master cell group, MCG, with the failure being a MCG failure.

Embodiments herein also include a method performed by a master radio network node that provides a master cell group for a wireless device in multi-connectivity operation. The method comprises receiving, from a wireless device that has a conditional configuration stored at the wireless device, a report of a failure associated with a cell group in multi-connectivity operation. The method also comprises, after receiving the report, transmitting delta signaling to the wireless device that configures the wireless device relative to the conditional configuration.

In some embodiments, the delta signaling indicates the wireless device is to release the conditional configuration.

In some embodiments, the delta signaling indicates the wireless device is to modify the conditional configuration and/or add another conditional configuration, on the assumption that the wireless device kept at least part of the conditional configuration stored at the wireless device after reporting the failure.

In some embodiments, the conditional configuration is a conditional PSCell change configuration that conditionally configures a change to a PSCell for the multi-connectivity operation. A PSCell is a primary cell of a secondary cell group included in multiple cell groups that are respectively provided by multiple radio network nodes to which the wireless device simultaneously connects in the multi-connectivity operation.

In some embodiments, the conditional configuration is a conditional PCell change configuration that conditionally configures a change to a PCell for the multi-connectivity operation. A PCell is a primary cell of the master cell group included in multiple cell groups that are respectively provided by multiple radio network nodes to which the wireless device simultaneously connects in the multi-connectivity operation.

In some embodiments, in the multi-connectivity operation, the wireless device simultaneously connects to multiple radio network nodes that respectively provide multiple cell groups, including the master cell group provided by the master radio network node and a secondary cell group provided by a secondary radio network node. In this case the cell group is the secondary cell group, SCG, and the failure is a SCG failure.

In some embodiments, the conditional configuration is a conditional handover configuration.

In some embodiments, in the multi-connectivity operation, the wireless device simultaneously connects to multiple radio network nodes that respectively provide multiple cell groups, including the master cell group provided by the master radio network node and a secondary cell group provided by a secondary radio network node. In this case the cell group is the master cell group, MCG, and wherein the failure is a MCG failure.

Embodiments herein also include a wireless device. The wireless device is configured to detect a failure associated with a cell group in multi-connectivity operation. The wireless device is also configured to, responsive to detecting the failure, suspend monitoring of one or more trigger conditions whose fulfillment is to trigger execution of a conditional configuration stored at the wireless device.

In some embodiments, the wireless device is configured to perform any of the steps described above by a wireless device.

Embodiments herein also include a secondary radio network node configured to provide a secondary cell group for a wireless device in multi-connectivity operation. The secondary radio network node is configured to configure the wireless device with a conditional configuration. The secondary radio network node is also configured to, after configuring the wireless device with the conditional configuration, receive, from the wireless device, a report of a failure associated with a cell group in multi-connectivity operation. The secondary radio network node is also configured to, after receiving the report, transfer, to a master radio network node that provides a master cell group for the wireless device in multi-connectivity operation, a context for the wireless device that includes the conditional configuration.

In some embodiments, the secondary radio network node is configured to perform any of the steps described above by a secondary radio network node.

Embodiments herein also include a master radio network node configured to provide a master cell group for a wireless device in multi-connectivity operation. The master radio network node is configured to receive, from a wireless device that has a conditional configuration stored at the wireless device, a report of a failure associated with a cell group in multi-connectivity operation. The master radio network node is also configured to, after receiving the report, transmit delta signaling to the wireless device that configures the wireless device relative to the conditional configuration.

In some embodiments, the master radio network node is configured to perform any of the steps described above by a master radio network node.

Embodiments herein also include a computer program comprising instructions which, when executed by at least one processor of a wireless device, causes the wireless device to perform any of the steps described above by a wireless device. Embodiments herein also include a computer program comprising instructions which, when executed by at least one processor of a radio network node, causes the radio network node to perform any of the steps described above by a secondary radio network node. In some embodiments, a carrier containing the computer program is one of an electronic signal, optical signal, radio signal, or computer readable storage medium.

Embodiments herein also include a wireless device. The wireless device comprises communication circuitry and processing circuitry. The processing circuitry is configured to detect a failure associated with a cell group in multi-connectivity operation. The processing circuitry is also configured to, responsive to detecting the failure, suspend monitoring of one or more trigger conditions whose fulfillment is to trigger execution of a conditional configuration stored at the wireless device In some embodiments, the processing circuitry is configured to perform any of the steps described above by a wireless device.

Embodiments herein also include a secondary radio network node configured to provide a secondary cell group for a wireless device in multi-connectivity operation. The secondary radio network node comprises communication circuitry and processing circuitry. The processing circuitry is configured to configure the wireless device with a conditional configuration. The processing circuitry is also configured to, after configuring the wireless device with the conditional configuration, receive, from the wireless device, a report of a failure associated with a cell group in multi-connectivity operation. The processing circuitry is also configured to, after receiving the report, transfer, to a master radio network node that provides a master cell group for the wireless device in multi-connectivity operation, a context for the wireless device that includes the conditional configuration.

In some embodiments, the processing circuitry configured to perform any of the steps described above by a secondary radio network node.

Embodiments herein also include a master radio network node configured to provide a master cell group for a wireless device in multi-connectivity operation. The master radio network node comprises communication circuitry and processing circuitry. The processing circuitry is configured to receive, from a wireless device that has a conditional configuration stored at the wireless device, a report of a failure associated with a cell group in multi-connectivity operation. The processing circuitry is also configured to, after receiving the report, transmit delta signaling to the wireless device that configures the wireless device relative to the conditional configuration.

In some embodiments, the processing circuitry configured to perform any of the steps described above by a master radio network node.

DETAILED DESCRIPTION

Figure 1:
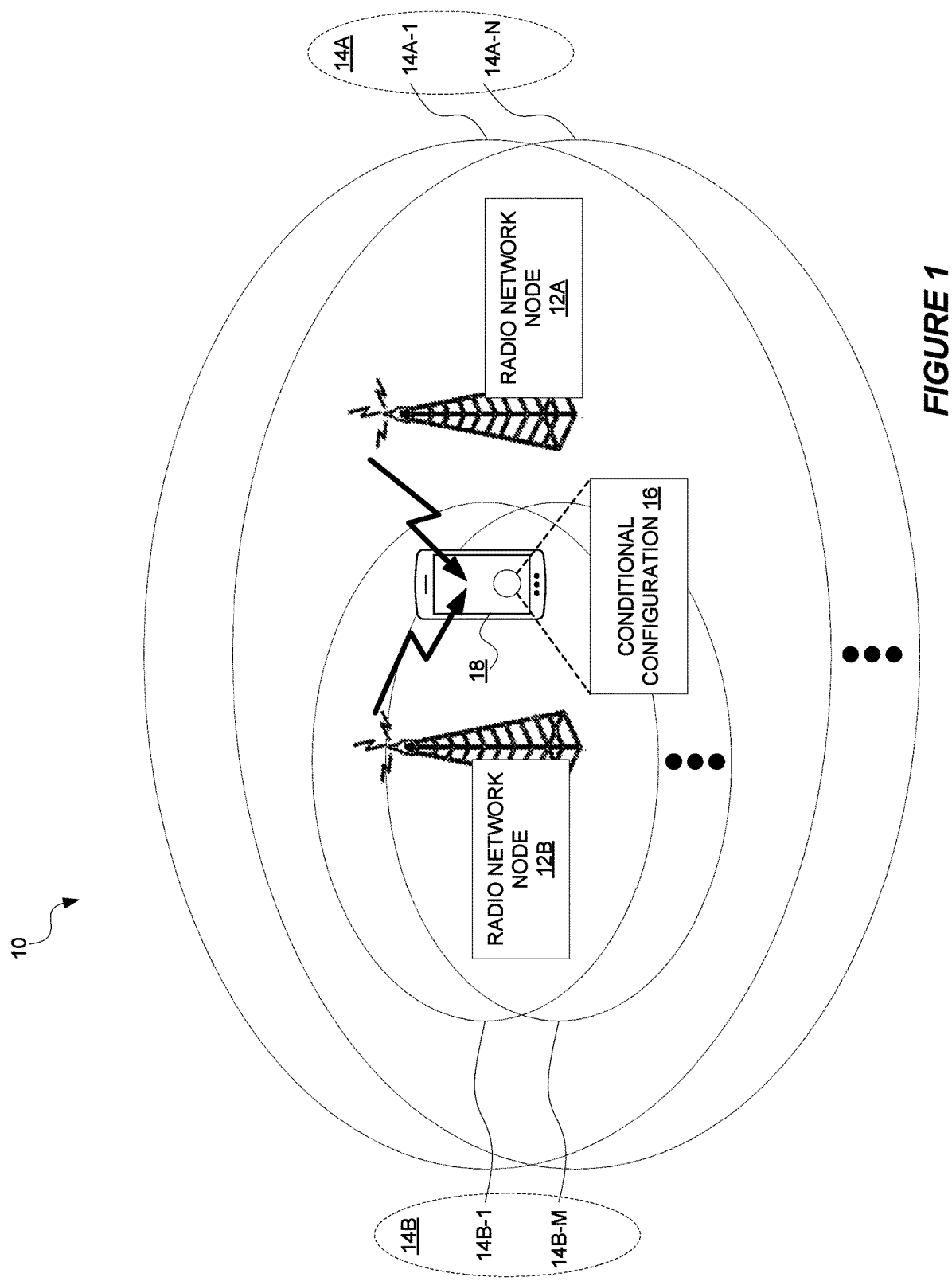
FIG. 1 is a block diagram of a wireless communication network according to some embodiments.

FIG. 1 shows a wireless communication network 10 according to some embodiments. The network 10 as shown includes radio network nodes 12A and 12B (e.g., in the form of base stations). The radio network nodes 12A and 12B may be included in a radio access network (RAN) portion of the network 10, which may in turn connect to a core network (CN) portion (not shown).

Each radio network node 12A, 12B serves one or more cells. As shown, for example, a first radio network node 12A provides a first cell group 14A that includes N cells 14A-1, . . . 14A-N, for N≥1. A second radio network node 12B provides a second cell group 14B that includes M cells 14B-1, . . . 14B-M, for M≥1. Different cells may for instance be provided on different carrier frequencies, with different frequency bandwidths, and/or using different radio access technologies.

In some embodiments, a wireless device 18 is configured with and/or capable of multi-connectivity operation. In multi-connectivity operation, the wireless device 18 simultaneously connects (e.g., at a radio resource control, RRC, layer) to multiple different radio network nodes 12A, 12B, or to multiple different cells served by different radio network nodes 12A, 12B. The multiple different radio network nodes or cells may use the same radio access technology (e.g., both may use Evolved Universal Terrestrial Radio Access (E-UTRA) or both may use New Radio (NR)). Or, the multiple different radio network nodes or cells may use different radio access technologies, e.g., one may use E-UTRA and another may use NR.

One example of multi-connectivity is dual connectivity (DC) in which the wireless device 18 is simultaneously connected to two different radio network nodes, or to two different cells served by two different radio network nodes. In this case, the wireless device 18 may be configured with a so-called master cell group (MCG) and a secondary cell group (SCG). Here, the MCG includes one or more cells served by the radio network node acting as a master node, i.e., a group of serving cells associated with the master node. The MCG may include a primary cell and optionally one or more secondary cells. The primary cell of the MCG is referred to as a PCell. The SCG includes one or more cells served by the radio network node acting as a secondary node, i.e., a group of serving cells associated with the secondary node. The SCG may include a primary cell and optionally one or more secondary cells. The primary cell of the SCG is referred to as the PSCell.

The master node may be a master in the sense that it controls the secondary node. Alternatively or additionally, the master node may be a master in the sense that it is a radio access node that provides the control plane connection for the wireless device 18 to the core network, whereas the secondary node lacks a control plane connection for the wireless device 18 to the core network.

Different types of dual connectivity may be employed by different embodiments. In some embodiments, the wireless device 18 operates with E-UTRA-NR (EN) DC, where the master node uses E-UTRA and the secondary node uses NR. In other embodiments, the wireless device 18 operates with NR-E-UTRA (NE) DC, where the master node uses NR and the secondary node uses E-UTRA. Generally, though, the wireless device 18 in some embodiments operates with multi-radio (MR) DC, which refers to dual connectivity between E-UTRA and NR nodes, or between two NR nodes. MR-DC therefore may be seen as a generalization of Intra-U-UTRA DC, where a multiple receiver/transmitter capable device is configured to utilize resources provided by two different nodes connected via a non-ideal backhaul, one providing NR access and the other providing either E-UTRA or NR access. Regardless, in MR-DC, the wireless device 18 may have a single RRC state, based on the master node RRC and a single control plane connection towards the core network. RRC protocol data units (PDUs) generated by the secondary node can be transmitted via the master node to the wireless device 18.

In some embodiments, the network 10 controls at least some aspects of configuration of the wireless device 18. The network 10 in this regard may transmit to the wireless device 18 a configuration, e.g., an RRC configuration or RRC reconfiguration, that, when applied (i.e., executed) by the wireless device 18, configures the device 18 in a certain way. The configuration may for instance be a mobility configuration that configures the wireless device 18 to use certain cell(s) to access the network 10. In some embodiments, a mobility configuration may for example configure the wireless device 18 to perform a switch from accessing the network 10 via one cell to accessing the system via another cell, e.g., in connected mode. In some embodiments, this switch may be a handover. In other embodiments, a configuration may configure the wireless device 18 to use more or less links to access the network 10, e.g., in the context of dual connectivity, carrier aggregation, or the like. For example, the configuration may be a configuration for adding or changing a secondary cell group (SCG) or a secondary cell, e.g., the configuration may be a PSCell change or addition configuration. In still other embodiments, the configuration may be a configuration for resuming a connection, e.g., an RRC connection resume, for a reconfiguration with sync, for a reconfiguration, for a reestablishment, or the like.

According to embodiments herein, though, the network 10 may transmit the configuration to the wireless device 18 but indicate that the wireless device 18 is to only conditionally apply that configuration. In this sense, then, the network 10 may transmit to the wireless device 18 a so-called conditional configuration 16 that is a configuration that the wireless device 18 is to conditionally apply. The wireless device 18 in this case stores the conditional configuration at the wireless device 18, monitors for if or when a condition is fulfilled while the conditional configuration is stored, and then applies the conditional configuration upon the fulfillment of a condition. For example, a PSCell change configuration that the wireless device 18 is to conditionally apply may be referred to as a conditional PSCell change (CPC). The wireless device 18 in such an example stores the PSCell change configuration and selectively applies the PSCell change upon fulfillment of a condition.

In this context, the wireless device 18 as shown stores a conditional configuration 16, e.g., a Radio Resource Control (RRC) configuration. The stored conditional configuration 16 is a configuration that the wireless device 18 is to apply upon the fulfillment of a condition. The stored conditional configuration 16 may be a configuration for a certain cell or cell group. For example, the stored conditional configuration 16 may be a conditional mobility configuration, such as a conditional handover configuration on the MCG or a conditional resume configuration on the MCG. Alternatively, the stored conditional configuration 16 may be a conditional PCell addition or change configuration on the MCG, or a conditional PSCell addition or change configuration on the SCG. That is, in some embodiments, the conditional configuration 16 is a conditional PSCell change or addition configuration that conditionally configures a change to or addition of a PSCell for the device's multi-connectivity operation. In other embodiments, the conditional configuration 16 is a conditional PCell change or addition configuration that conditionally configures a change to or addition of a PCell for the device's multi-connectivity operation. A PCell change may also be referred to as a handover, such that a conditional PCell change may be referred to as a conditional handover.

While the wireless device 18 stores the conditional configuration 16, though, the wireless device 18 may detect a failure, such as an SCG failure or an MCG failure while operating in multi-connectivity. Such failure may be associated for instance with radio link failure on the SCG or MCG.

Some embodiments herein concern how the wireless device 18 is to handle the stored conditional configuration 16 upon failure detection, e.g., SCG failure or MCG failure. In some embodiments, the wireless device 18 deletes or releases at least a part of the stored conditional configuration 16 upon failure detection. A network node (e.g., a secondary node or a master node) may correspondingly operate on the assumption that the wireless device 18 deletes or releases at least a part of the stored conditional configuration 16 upon failure detection. This way, no mismatch occurs between the wireless device 18 and the network 10.

In other embodiments, by contrast, the wireless device 18 continues to store (i.e., maintains) at least a part of the stored conditional configuration 16 upon failure detection. A network node (e.g., a secondary node or a master node) may correspondingly operate on the assumption that the wireless device 18 keeps or maintains at least a part of the stored conditional configuration 16 upon failure detection. This way, no mismatch occurs between the wireless device 18 and the network 10. Moreover, the network node in some embodiments performs delta signaling relative to the kept or maintained part(s) of the conditional configuration 16, e.g., so as to reduce signaling overhead.

Figure 2:
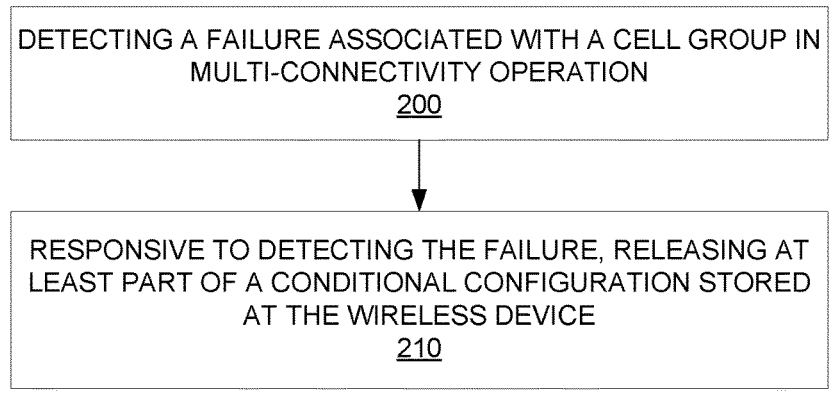
FIG. 2 is a logic flow diagram of a method performed by a wireless device according to some embodiments.

FIG. 2 depicts a method performed by a wireless device in accordance with particular embodiments. The method includes detecting a failure associated with a cell group in multi-connectivity operation (Block 200). The method also includes, responsive to detecting the failure, releasing at least part of a conditional configuration stored at the wireless device (Block 210). The conditional configuration in some embodiments is a conditional PCell addition/change configuration or a conditional PSCell addition/change configuration.

Figure 3:
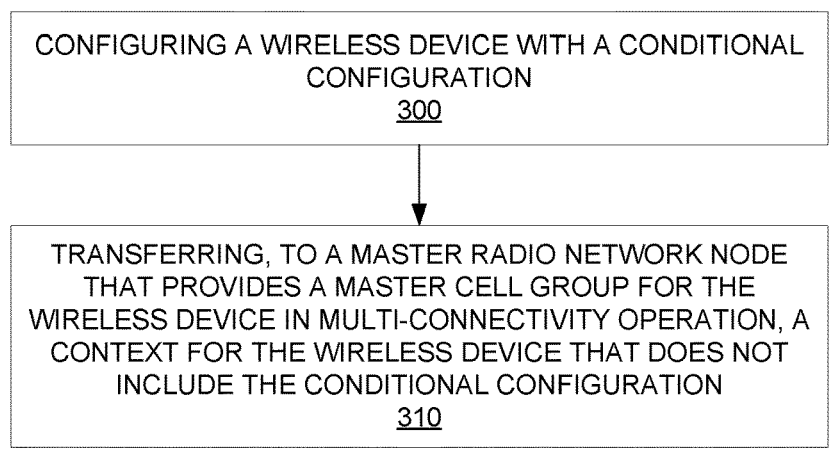
FIG. 3 is a logic flow diagram of a method performed by a secondary radio network node according to some embodiments.

FIG. 3 depicts a method performed by a secondary radio network node that provides a secondary cell group for a wireless device in multi-connectivity operation in accordance with other particular embodiments. The method includes configuring a wireless device with a conditional configuration (Block 300). The conditional configuration in some embodiments is a conditional PCell addition/change configuration or a conditional PSCell addition/change configuration. Regardless, the method further includes transferring, to a master radio network node that provides a master cell group for the wireless device in multi-connectivity operation, a context for the wireless device that does not include the conditional configuration (Block 310).

Figure 4:
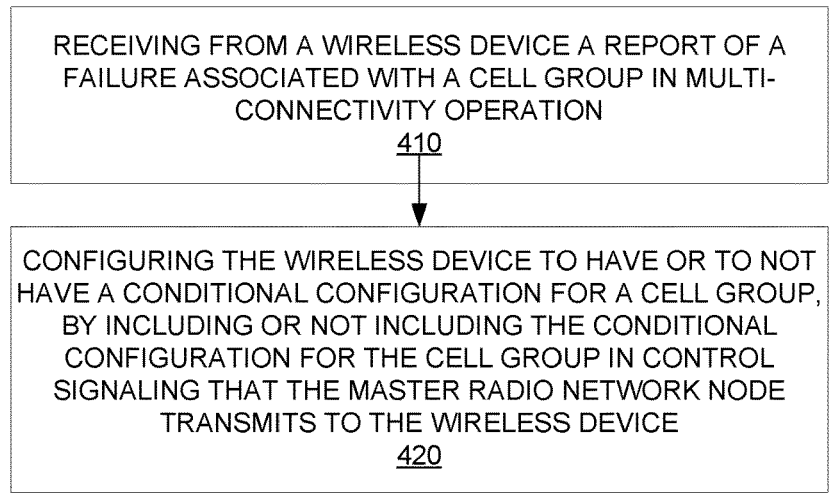
FIG. 4 is a logic flow diagram of a method performed by a master radio network node according to some embodiments.

FIG. 4 depicts a method performed by a master radio network node that provides a master cell group for a wireless device in multi-connectivity operation in accordance with other particular embodiments. The method in some embodiments includes receiving from a wireless device a report of a failure associated with a cell group in multi-connectivity operation (Block 410). The method also includes configuring the wireless device to have or to not have a conditional configuration for a cell group, by including or not including the conditional configuration for the cell group in control signaling that the master radio network node transmits to the wireless device (Block 420). The conditional configuration in some embodiments is a conditional PCell addition/change configuration or a conditional PSCell addition/change configuration.

Figure 5:
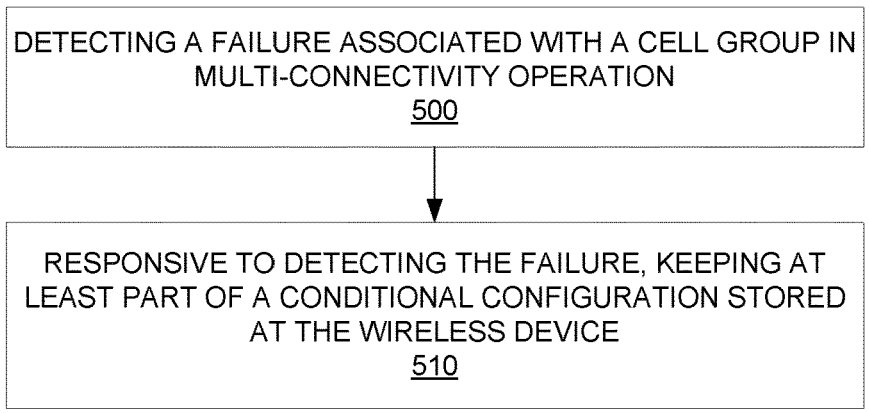
FIG. 5 is a logic flow diagram of a method performed by a wireless device according to some embodiments.

FIG. 5 depicts a method performed by a wireless device in accordance with particular embodiments. The method includes detecting a failure associated with a cell group in multi-connectivity operation (Block 500). The method also includes, responsive to detecting the failure, keeping at least part of a conditional configuration stored at the wireless device (Block 510). The conditional configuration in some embodiments is a conditional PCell addition/change configuration or a conditional PSCell addition/change configuration.

Figure 6:
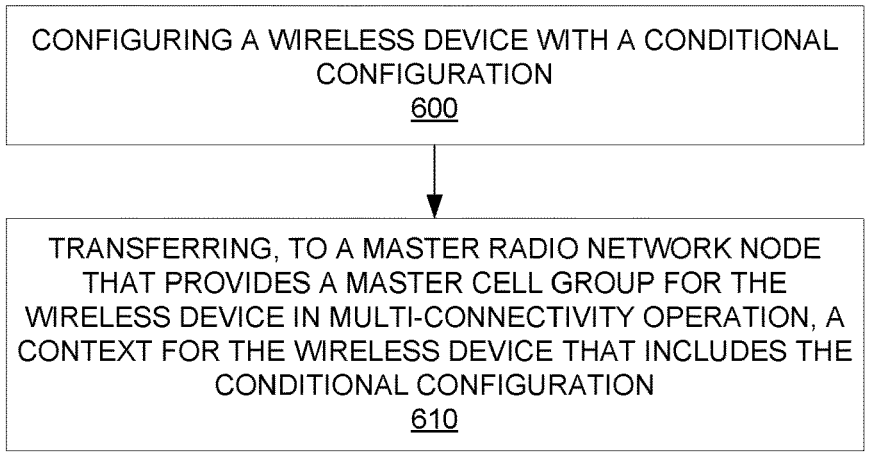
FIG. 6 is a logic flow diagram of a method performed by a secondary radio network node according to some embodiments.

FIG. 6 depicts a method performed by a secondary radio network node that provides a secondary cell group for a wireless device in multi-connectivity operation in accordance with other particular embodiments. The method includes configuring a wireless device with a conditional configuration (Block 600). The conditional configuration in some embodiments is a conditional PCell addition/change configuration or a conditional PSCell addition/change configuration. Regardless, the method further includes transferring, to a master radio network node that provides a master cell group for the wireless device in multi-connectivity operation, a context for the wireless device that includes the conditional configuration (Block 610).

Figure 7:
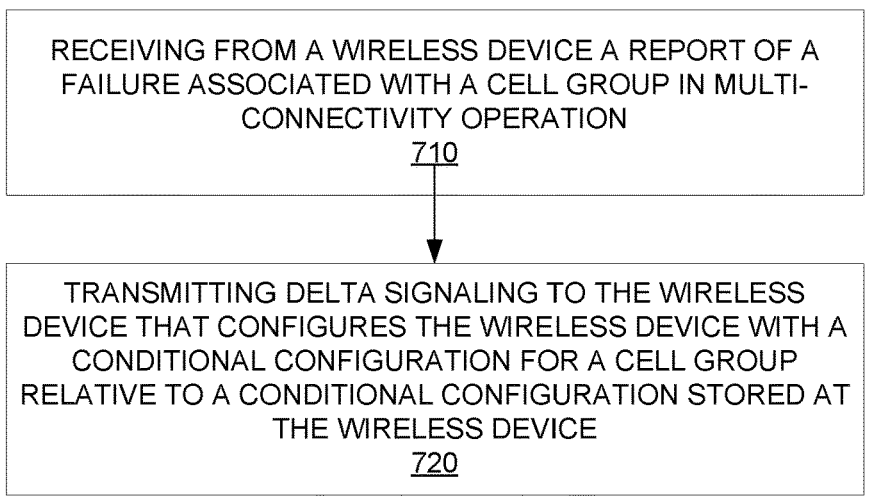
FIG. 7 is a logic flow diagram of a method performed by a master radio network node according to some embodiments.

FIG. 7 depicts a method performed by a master radio network node that provides a master cell group for a wireless device in multi-connectivity operation in accordance with other particular embodiments. The method in some embodiments includes receiving from a wireless device a report of a failure associated with a cell group in multi-connectivity operation (Block 710). The method also includes transmitting delta signaling to the wireless device that configures the wireless device with a conditional configuration for a cell group relative to a conditional configuration stored at the wireless device (Block 720). The conditional configuration in some embodiments is a conditional PCell addition/change configuration or a conditional PSCell addition/change configuration.

Embodiments herein also include corresponding apparatuses. Embodiments herein for instance include a wireless device configured to perform any of the steps of any of the embodiments described above for the wireless device.

Embodiments also include a wireless device 18 comprising processing circuitry and power supply circuitry. The processing circuitry is configured to perform any of the steps of any of the embodiments described above for the wireless device 18. The power supply circuitry is configured to supply power to the wireless device 18.

Embodiments further include a wireless device 18 comprising processing circuitry. The processing circuitry is configured to perform any of the steps of any of the embodiments described above for the wireless device 18. In some embodiments, the wireless device 18 further comprises communication circuitry.

Embodiments further include a wireless device 18 comprising processing circuitry and memory. The memory contains instructions executable by the processing circuitry whereby the wireless device 18 is configured to perform any of the steps of any of the embodiments described above for the wireless device 18.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device 18. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node 12A, 12B configured to perform any of the steps of any of the embodiments described above for the radio network node 12A, 12B.

Embodiments also include a radio network node 12A, 12B comprising processing circuitry and power supply circuitry. The processing circuitry is configured to perform any of the steps of any of the embodiments described above for the radio network node 12A, 12B. The power supply circuitry is configured to supply power to the radio network node 12A, 12B.

Embodiments further include a radio network node 12A, 12B comprising processing circuitry. The processing circuitry is configured to perform any of the steps of any of the embodiments described above for the radio network node 12A, 12B. In some embodiments, the radio network node 12A, 12B further comprises communication circuitry.

Embodiments further include a radio network node 12A, 12B comprising processing circuitry and memory. The memory contains instructions executable by the processing circuitry whereby the radio network node 12A, 12B is configured to perform any of the steps of any of the embodiments described above for the radio network node 12A, 12B.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
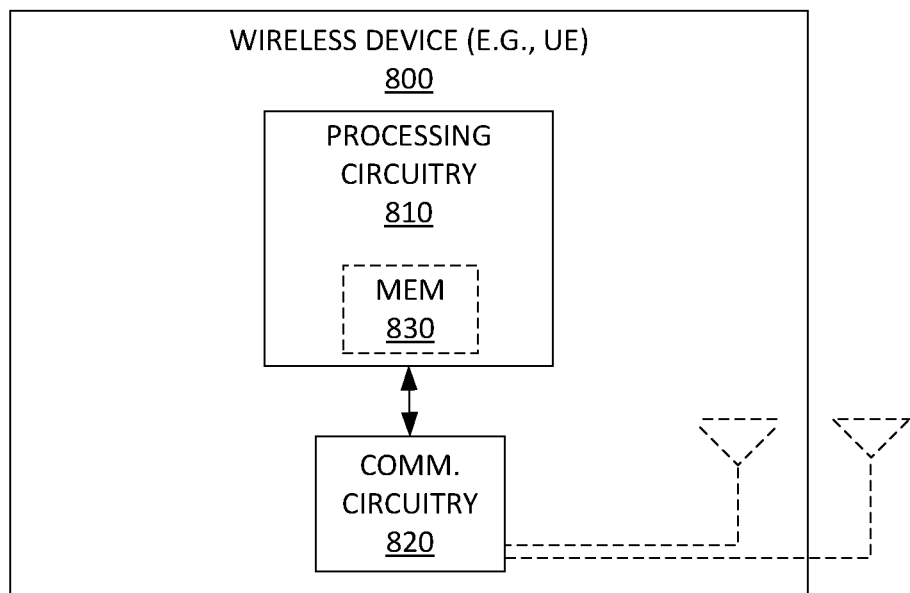
FIG. 8 is a block diagram of a wireless device according to some embodiments.

FIG. 8 for example illustrates a wireless device 800 (e.g., wireless device 18) as implemented in accordance with one or more embodiments. As shown, the wireless device 800 includes processing circuitry 810 and communication circuitry 820. The communication circuitry 820 (e.g., radio circuitry) is configured to transmit and/or receive information to and/or from one or more other nodes, e.g., via any communication technology. Such communication may occur via one or more antennas that are either internal or external to the wireless device 800. The processing circuitry 810 is configured to perform processing described above, e.g., in FIG. 2, such as by executing instructions stored in memory 830. The processing circuitry 810 in this regard may implement certain functional means, units, or modules.

Figure 9:
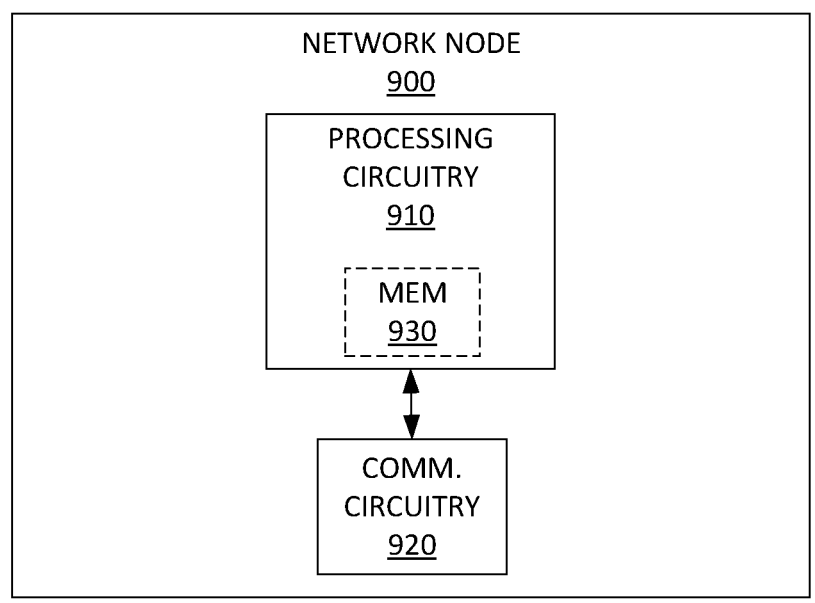
FIG. 9 is a block diagram of a network node according to some embodiments.

FIG. 9 illustrates a network node 900 (e.g., radio network node 12A or 12B) as implemented in accordance with one or more embodiments. As shown, the network node 900 includes processing circuitry 910 and communication circuitry 920. The communication circuitry 920 is configured to transmit and/or receive information to and/or from one or more other nodes, e.g., via any communication technology. The processing circuitry 910 is configured to perform processing described above, e.g., in FIG. 3, such as by executing instructions stored in memory 930. The processing circuitry 910 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described. In the below, the wireless device 18 may be exemplified as a UE. A master node above is exemplified as a Master Node (MN) in terms of 3GPP standards, a secondary node is exemplified as a Secondary Node (SN) in terms of 3GPP standards, a master cell group is exemplified as a Master Cell Group (MCG) in terms of 3GPP standards, and a secondary cell group is exemplified as a Secondary Cell Group (SCG) in terms of 3GPP standards. Also, multi-connectivity operation is exemplified in terms of MR-DC.

Some embodiments herein are applicable to solutions for enhancing mobility, e.g., in LTE and NR. Some embodiments in particular are applicable in conjunction with solutions to improve the robustness at handover and to decrease the interruption time at handover.

One solution to increase mobility robustness in NR is called "conditional handover" or "early handover command". In order to avoid the undesired dependence on the serving radio link upon the time (and radio conditions) where the UE should execute the handover, the possibility to provide RRC signaling for the handover to the UE earlier is provided. To achieve this, it is possible to associate the HO command with a condition, e.g. based on radio conditions possibly similar to the ones associated to an A3 event, where a given neighbour becomes X db better than target. As soon as the condition is fulfilled, the UE executes the handover in accordance with the provided handover command.

Such a condition could e.g. be that the quality of the target cell or beam becomes X dB stronger than the serving cell. The threshold Y used in a preceding measurement reporting event should then be chosen lower than the one in the handover execution condition. This allows the serving cell to prepare the handover upon reception of an early measurement report and to provide the RRCConnectionReconfiguration with mobilityControlInfo at a time when the radio link between the source cell and the UE is still stable. The execution of the handover is done at a later point in time (and threshold) which is considered optimal for the handover execution.

Figure 10:
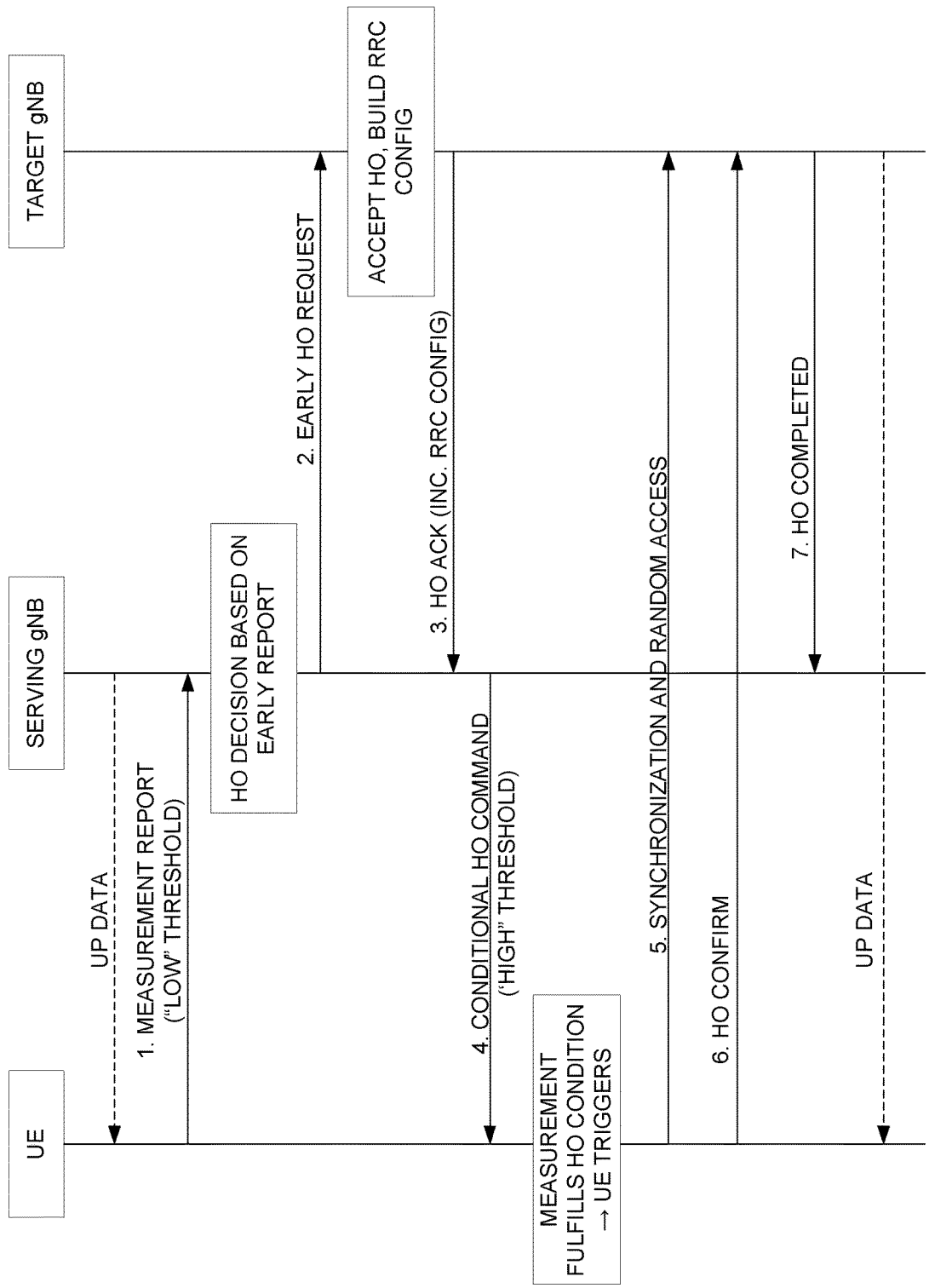
FIG. 10 is a call flow diagram of a conditional handover procedure according to some embodiments.

FIG. 10 depicts an example with just a serving cell and a target cell. In practice there may often be many cells or beams that the UE reported as possible candidates based on its preceding radio resource management (RRM) measurements. The network should then have the freedom to issue conditional handover commands for several of those candidates. The RRCConnectionReconfiguration for each of those candidates may differ, e.g. in terms of the HO execution condition (reference signal, RS, to measure and threshold to exceed) as well as in terms of the random access (RA) preamble to be sent when a condition is met.

While the UE evaluates the condition, it should continue operating per its current RRC configuration, i.e., without applying the conditional HO command. When the UE determines that the condition is fulfilled, it disconnects from the serving cell, applies the conditional HO command and connects to the target cell. These steps are equivalent to the current, instantaneous handover execution.

More particularly, in FIG. 10, the serving gNB may transmit user plane (UP) data to the UE. In step 1, the UE sends a measurement report with a "low" threshold to the serving gNB. The serving gNB makes a handover (HO) decision based on this early report. In step 2, the serving gNB sends an early HO request to a target gNB. The target gNB accepts the HO request and builds an RRC configuration. The target gNB returns a HO acknowledgement, including the RRC configuration, to the serving gNB in step 3. In step 4, a conditional HO command with a "high" threshold is sent to the UE. Subsequently, measurements by the UE may fulfil the HO condition of the conditional HO command. The UE thus triggers the pending conditional handover. The UE performs synchronization and random access with the target gNB in step 5, and HO confirm is transmitted in step 6. In step 7, the target gNB informs the serving gNB that HO is completed. The target gNB may then transmit user plane (UP) data to the UE.

In a conditional handover (CHO), then a UE has a network configuration for initiating access to a target cell based on configuration condition(s). Usage of conditional handover is decided by the network. The UE evaluates when the condition is valid. The baseline operation for Conditional HO procedure assumes HO command type of message contains HO triggering condition(s) and dedicated RRC configuration(s). The UE accesses the prepared target when the relevant condition is met. The baseline operation for Conditional HO assumes the source RAN remains responsible for RRC until the UE successfully sends RRC Reconfiguration Complete message to target RAN. Cell level quality and/or beam level quality may be used as baseline for CHO execution condition. Ax events (entry condition) are used for CHO execution condition and A3/5 as baseline. Trigger quantity for CHO execution condition (RSRP, RSRQ or RS-SINR) is configured by network.

Some embodiments herein are usable for such a conditional handover, such that a conditional handover configuration is one example of the conditional configuration 16 in FIG. 1. An example of a Conditional Handover configuration per target cell candidate, using ASN.1 notion, is shown below:

| CondReconfigurationPerTargetCandidate information element |
|---|
| -- ASN1START<br>-- TAG-CONDRECONFIGURATIONPERTARGETCANDIDATE-START<br>CondReconfigurationPerTargetCandidate ::=    SEQUENCE {<br>    rrcReconfigurationToApply    OCTET STRING (CONTAINING RRCReconfiguration)<br>    triggerCondition    MeasId,<br>    ...<br>}<br>-- TAG- CONDRECONFIGURATIONPERTARGETCANDIDATE-STOP<br>-- ASN1STOP |

Alternatively or additionally, some embodiments herein are usable for a conditional PSCell addition and Conditional PSCell change configurations, as other examples of the conditional configuration 16 in FIG. 1. These conditional configurations may be configured using the same RRCReconfiguration message provided in a container during CHO configuration per target candidate e.g. in an OCTET STRING. And, in MR-DC operation, the UE could distinguish conditional handovers, conditional PSCell changes and additions based on the fields/IEs included in the RRCReconfiguration e.g. secondaryCellGroup of IE CellGroupConfig containing a reconfigurationWithSync as an indication of a PSCell addition, if no other PSCell is configured.

Even though other events in addition to A3/A5 agreed for CHO may be needed to support PSCell addition/change, the principle of having a reference via a measId (or list of measId(s), if network wants to configure multiple triggers) to the VarMeasConfig is still applicable. Hence, the same signalling structure per target candidate used to configure CHO may be re-used to configure Conditional PSCell addition and Conditional PSCell change.

SCG Failure Handling

In some embodiments, a UE operating in Multi-Radio Dual Connectivity (MR-DC) is required to perform radio link monitoring in each SpCell i.e. in the PCell (i.e. SpCell of the Master Cell Group-MCG) and in the PSCell (i.e. SpCell of the Secondary Cell Group-SCG).

Hence, the UE may detect an SCG radio link failure (RLF), which leads to the transmission of an SCG failure report including a failure type and measurement results. That aims to assist the Master Node (MN) and/or Secondary Node (SN) to select a new target candidate for SCG addition and/or to indicate what caused the failure (so that is possibly avoided in future e.g. by making event triggered settings more conservative, to avoid too late SCG changes).

In particular, a UE shall perform the following upon T310 expiry in PSCell, or upon random access problem indication from SCG MAC, or upon indication from SCG Radio Link Control (RLC) that the maximum number of retransmissions has been reached. If the indication is from SCG RLC and carrier aggregation (CA) duplication is configured and activated; and for the corresponding logical channel allowed-ServingCells only includes SCell(s): initiate the failure information procedure to report RLC failure. Else, the UE is to consider radio link failure to be detected for the SCG, i.e. SCG RLF, and initiate the SCG failure information procedure to report SCG radio link failure.

Figure 11:
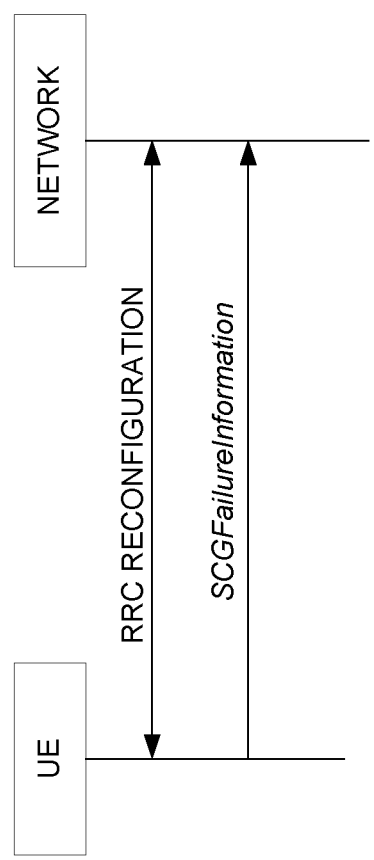
FIG. 11 is a call flow diagram of an SCG failure information procedure according to some embodiments.

FIG. 11 shows the SCG failure information procedure. The purpose of this procedure is to inform E-UTRAN or NR master node (MN) about an SCG failure the UE has experienced, e.g., SCG radio link failure, failure of SCG reconfiguration with sync, SCG configuration failure for RRC message on signaling radio bearer #3 (SRB3) and SCG integrity check failure.

A UE initiates the procedure to report SCG failures when SCG transmission is not suspended and when one of the following conditions is met: (i) upon detecting radio link failure for the SCG; (ii) upon reconfiguration with sync failure of the SCG; (iii) upon SCG configuration failure; (iv) upon integrity check failure indication from SCG lower layers concerning SRB3.

Upon initiating the procedure, the UE shall suspend SCG transmission for all SRBs and DRBs, reset SCG MAC, and stop T304, if running. If the UE is in (NG)EN-DC, the UE shall initiate transmission of the SCGFailureInformationNR message. Else, the UE shall initiate transmission of the SCGFailureInformation message.

The SCG failure recovery solution may be extended to MCG failure recovery. MCG fast recovery targets all MRDC architecture options. When MCG failure occurs, UE follows SCG failure-like procedure: UE does not trigger RRC connection re-establishment, and UE triggers an MCG failure procedure in which a failure information message is transmitted to the network via SCG.

MCG failure indication should include: available measurement results of MCG, MCG link failure cause, available measurement results of SCG, and available measurement results of non-serving cells. An RRC message MCGFailureInformation is used for MCG failure indication.

Once the MCG failure indication is triggered, the UE shall transmit the MCG failure indication, suspend MCG transmission for all SRBs and DRBs, reset MCG-MAC, maintain the current measurement configurations from both the MN and the SN, and continue measurements based on configuration from the MN and the SN if possible.

Upon sending an MCG failure indication, the UE starts a timer. Upon resumption of MCG, UE stops the timer. Upon expiry of the timer, UE initiates RRC connection re-establishment procedure.

Some embodiments address certain challenge(s) in these contexts. As described above, the UE may be configured with conditional PSCell change/addition configurations (e.g. configured on the SCG) or conditional handover configurations (e.g. configured on the MCG), which comprises at least one measId and an RRCReconfiguration in an OCTET STRING per target candidate. And, as the UE may be operating in MR-DC, the UE may detect an SCG failure and upon detecting the failure, the UE transmits an SCG Failure report to the MN including information such as failure type and measurements. These may assist the MN and/or SN to take further actions such as configuring the UE to add a new SCG, reconfiguring the existing SCG, releasing the previously configured SCG (as the UE still keeps the SCG configurations upon failure), etc.

Similarly, the UE may be configured with conditional handover configurations (e.g. configured on the MCG) or conditional PSCell change/addition configurations (e.g. configured on the SCG), or which comprises at least one measId and an RRCReconfiguration in an OCTET STRING per target candidate. And, as the UE may be operating in MR-DC, the UE may detect an MCG failure and upon detecting the failure, the Rel-16 behaviour defines that the UE transmits an MCG Failure report to the MN including information such as failure type and measurements. These may assist the MN and/or SN to take further actions such as configuring the UE to add a new MCG, reconfiguring the existing MCG, etc.

Some embodiments herein address a problem that can occur when the UE operates in Multi-Radio Dual Connectivity (MR-DC) and is configured with conditional PSCell change configurations configured on the SCG and/or conditional handovers and/or conditional PSCell additions configured on the MCG, which comprises at least one measId and an RRCReconfiguration in an OCTET STRING per target candidate. As the UE may be operating in MR-DC, the UE may detect an SCG failure and upon detecting the failure, it is heretofore not clear for the UE and/or the network what the UE does with these stored conditional PSCell configurations and/or conditional handover configurations.

One problem is if the UE keeps these configurations, but the network assumes the UE has deleted them. If that happens, and the network does not want the UE to monitor any conditional PSCell change (CPC) configuration, the network will not include conditional PSCell change configurations in the next RRCReconfiguration from the MN. However, as the UE may have kept these configurations, the UE may heretofore interpret that message without conditional configurations as if the network would want the UE to resume the operation of the stored PSCell change/addition configurations, which is not what the network wanted the UE to do. Or, if this scenario happens, but the network wants the UE to monitor conditional PSCell change configuration, the network will include some conditional PSCell change configurations in the next RRCReconfiguration from the MN. However, as the UE may have kept these configurations, the UE may heretofore interpret that message with conditional configurations as if the network would want the UE to add more configurations, in addition to resume the operation of the stored PSCell change/addition configurations, which is not what the network wanted the UE to do.

Similar issue occur with the conditional handover configurations the UE may have stored when the SCG failure is detected.

Another problem is if UE deletes these configurations, but the network assumes the UE has kept them. If that happens, and the network wants the UE to monitor the conditional PSCell change configurations, the network assumed the UE has stored, the network will heretofore not include conditional PSCell change configurations in the next RRCReconfiguration from the MN. However, as the UE may have deleted these configurations, the UE may heretofore interpret that message as if the network would not want the UE to have PSCell change/addition configurations, which is not what the network wanted the UE to do. Or, if this scenario happens, but the network does not want the UE to monitor the conditional PSCell change configurations the network assumed the UE has stored, the network will heretofore include in the release list the conditional PSCell change configurations in the next RRCReconfiguration from the MN. However, this would be unnecessary signalling as the UE would have already deleted these configuration (even though the network is heretofore not aware of that).

Similar issue occurs with the conditional handover configurations the UE may have stored when the SCG failure is detected.

Similarly, another issue occurs when the UE operates in MR-DC and is configured with conditional PSCell change configurations configured on the SCG and/or conditional handovers and/or conditional PSCell addition configurations configured on the MCG, which comprises at least one measId and an RRCReconfiguration in an OCTET STRING per target candidate. As the UE may be operating in MR-DC, the UE may detect an MCG failure and upon detecting the MCG failure, it is heretofore not clear for the UE and/or the network what the UE does with these stored conditional PSCell configurations and/or conditional handover configurations.

One problem is if the UE keeps these configurations, but the network assumes the UE has deleted them. If that happens, and the network does not want the UE to monitor any CHO configuration (i.e., PCell change configuration), the network will not include CHO configurations in the next RRCReconfiguration from the SN. However, as the UE may have kept these configurations, the UE may heretofore interpret that message without conditional configurations as if the network would want the UE to resume the operation of the stored CHO configurations, which is not what the network wanted the UE to do. Or, if this scenario happens, but the network wants the UE to monitor CHO configurations, the network will heretofore include some CHO configurations in the next RRCReconfiguration from the SN. However, as the UE may have kept these configurations, the UE may heretofore interpret that message with conditional configurations as if the network would want the UE to add more configurations, in addition to resume the operation of the stored CHO configurations, which is not what the network wanted the UE to do.

A similar issue occurs with the conditional PSCell change configurations the UE may have stored when the MCG failure is detected.

Another problem is if the UE deletes these configurations, but the network assumes the UE has kept them. If that happens, and the network wants the UE to monitor the CHO configurations the network assumed the UE has stored, the network will heretofore not include CHO configurations in the next RRCReconfiguration from the SN. However, as the UE may have deleted these configurations, the UE may heretofore interpret that message as if the network would not want the UE to have CHO configurations, which is not what the network wanted the UE to do. Or, if this scenario happens, but the network does not want the UE to monitor CHO configurations the network assumed the UE has stored, the network will heretofore include in the release list the CHO configurations in the next RRCReconfiguration from the SN. However, this would be unnecessary signalling as the UE would heretofore have already deleted these configuration (even though the network is not aware of that).

Similar issue occurs with the conditional PSCell change configurations the UE may have stored when the MCG failure is detected.

Certain aspects of the present disclosure and their embodiments may provide solutions to these or other challenges.

One benefit of keeping configurations stored is the signalling reduction if the MN after SCG failure reporting if MN or SN wants to configured/re-configure conditional PSCell change, which would require the network considering CHO and conditional PSCell change configurations as part of the UE context in the SN. According to some embodiments herein, stored conditional PSCell changes upon SCG failure detection may be handled deterministically, e.g., release configurations, or suspend but keep stored configurations.

Deleting PSCell Change Configurations Upon SCG Failure

Figure 12A:
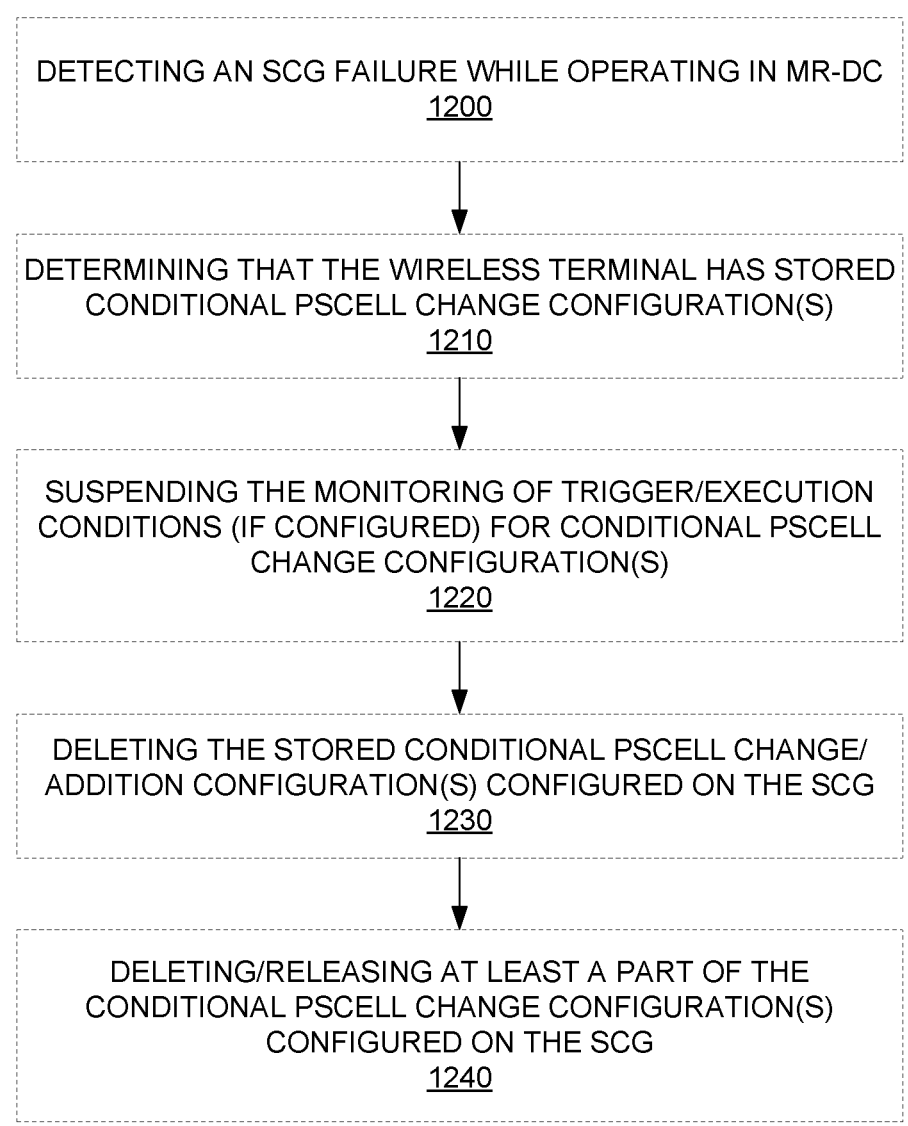
FIG. 12A is a logic flow diagram of a method performed by a wireless terminal according to some embodiments.

FIG. 12A shows a method at a wireless terminal (also called a User Equipment—UE). The method comprising one or more of the following steps. In one step, the method comprises detecting an SCG failure while operating in MR-DC (Block 1200). Alternatively or additionally, the method comprises determining that the wireless terminal has stored conditional PSCell change configuration(s) e.g. configured on the SCG (Block 1210).

Upon determining this, the method may comprise suspending the monitoring of trigger/execution conditions (if configured) for conditional PSCell change configuration(s) e.g. configured on the SCG (Block 1220). This may advantageously avoid the UE performing unnecessary measurements and/or avoid the UE to trigger/execute conditional PSCell change while the network is possibly handling the SCG failure.

In any event, upon determining that the wireless terminal has stored conditional PSCell change configuration(s), the method may alternatively or additionally comprise deleting the stored conditional PSCell change/addition configuration(s) configured on the SCG, e.g., to avoid configurations mismatch between the UE and the network (Block 1230).

Alternatively or additionally, upon determining that the wireless terminal has stored conditional PSCell change configuration(s), the method may comprise deleting/releasing at least a part of the conditional PSCell change configuration(s) configured on the SCG (Block 1240). This may be done to avoid any configurations mismatch between the UE and the network (e.g., both UE and network have the same understanding of the UE's current configurations, so delta signaling may be applied in an RRCReconfiguration message from the MN following up an SCG failure report to the MN). That is relevant since the SpCell of the MCG may not be aware of conditional PSCell change configurations that UE may have stored e.g. in the case the MN has been informed by the SN of possibly configured conditional PSCell change, which may be the case if the candidate target cells are within the same SN as the UE is connected to (and as key re-fresh is not needed, the MN does not have to be involved). One advantage of this approach is that it works even for scenarios where the MN has not been involved in conditional PSCell change configurations on the SCG, done by the SN, which may be the case if the target cell candidates were from the same SN the UE is connected to.

Figure 12B:
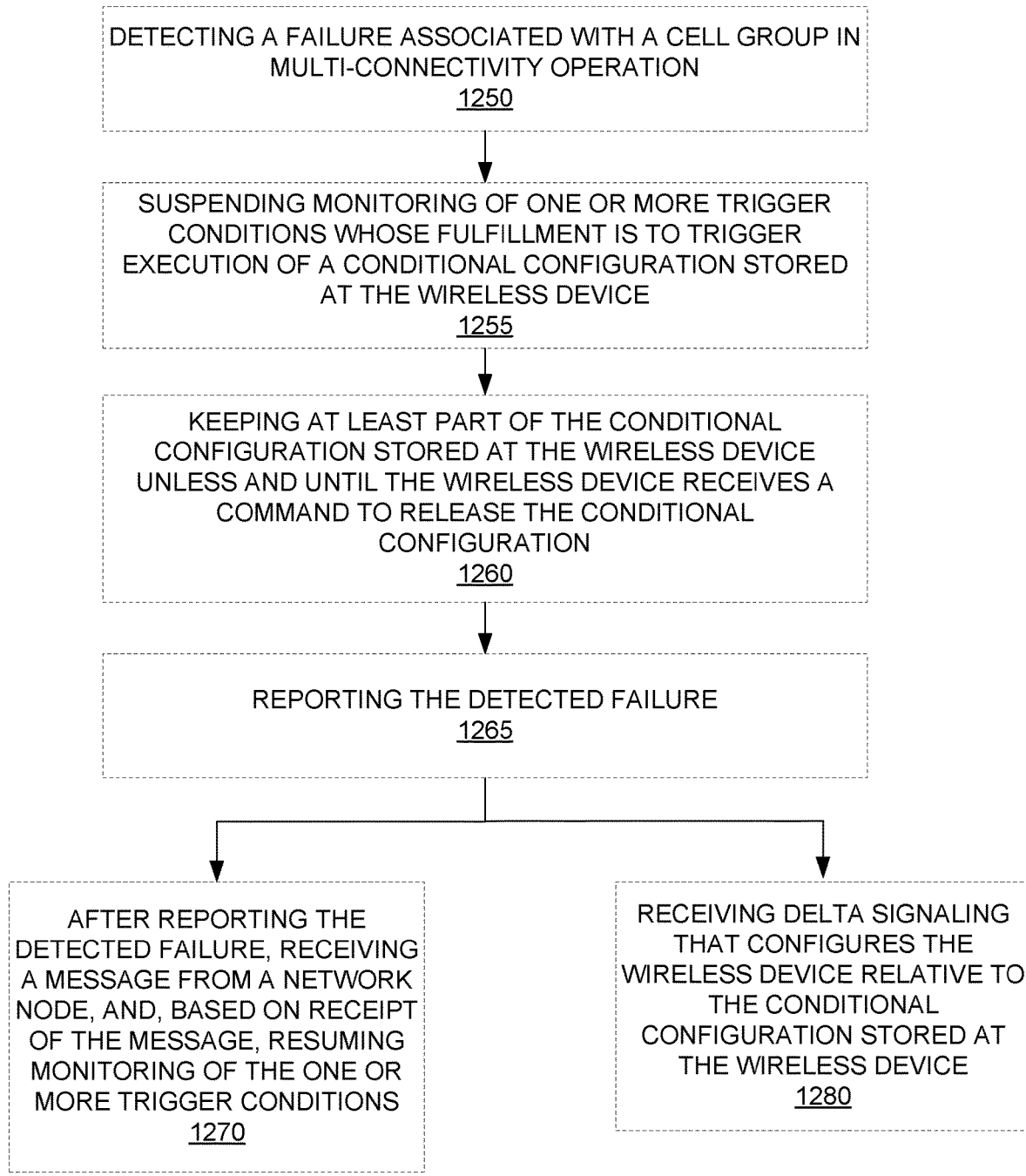
FIG. 12B is a logic flow diagram of a method performed by a wireless device according to other embodiments.

FIG. 12B shows a method performed by a wireless device according to some embodiments. The method comprises detecting a failure associated with a cell group (e.g., SCG) in multi-connectivity operation (Block 1250). The method may also comprise, responsive to detecting the failure, suspending monitoring of one or more trigger conditions whose fulfillment is to trigger execution of a conditional configuration 16 stored at the wireless device 18 (Block 1255). In some embodiments, the method comprises, responsive to detecting the failure, keeping at least part of the conditional configuration 16 stored at the wireless device 18 unless and until the wireless device 18 receives a command to release the conditional configuration 16 (Block 1260).

In some embodiments, the method further comprises reporting the detected failure (Block 1265). In one embodiment, the method may also comprise receiving a message from a network node, and, based on receipt of the message, resuming monitoring of the one or more trigger conditions (Block 1270). In other embodiments, the method may comprise, responsive to reporting the detected failure, receiving delta signaling that configures the wireless device 18 relative to the conditional configuration 16 stored at the wireless device (Block 1280).

Figure 13:
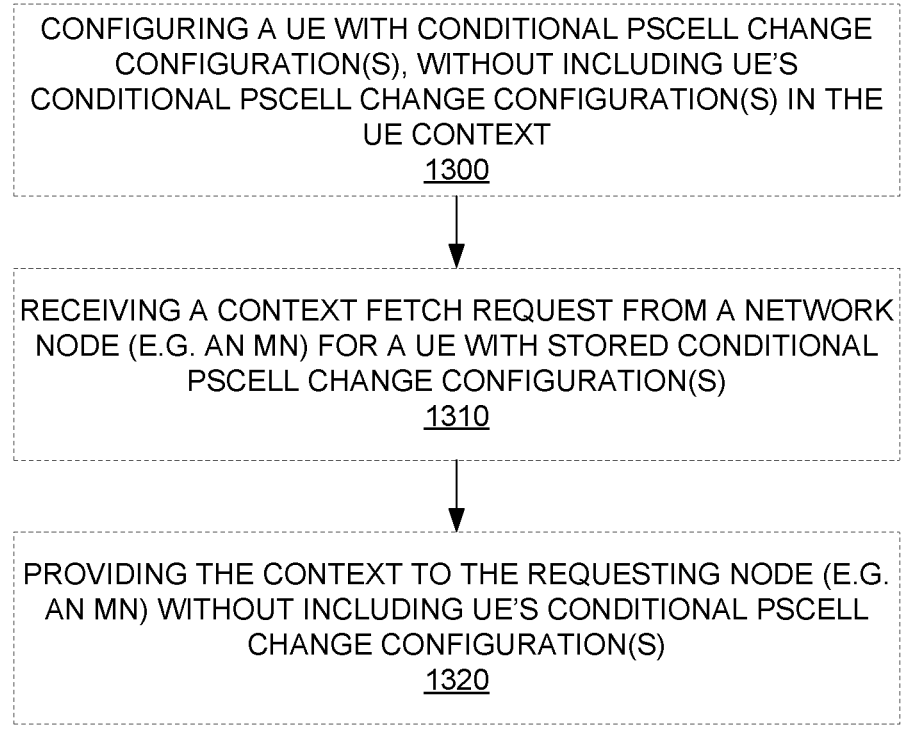
FIG. 13 is a logic flow diagram of a method performed by a SN network node according to some embodiments.

FIG. 13 shows a method at an SN network node (also called gNodeB). The method comprises one or more of the following steps. The method may comprise configuring a UE with conditional PSCell change configuration(s), without including UE's conditional PSCell change configuration(s) in the UE Context, i.e. if there is a request from another node to fetch/obtain the UE context, Conditional PSCell change configurations are not included (Block 1300). The method may also comprise receiving a context fetch request from a network node (e.g. an MN) for a UE with stored conditional PSCell change configuration(s) (Block 1310). The method may further comprise providing the context to the requesting node (e.g. an MN) without including UE's conditional PSCell change configuration(s) i.e. these configurations are not considered part of the UE context (Block 1320).

Figure 14:
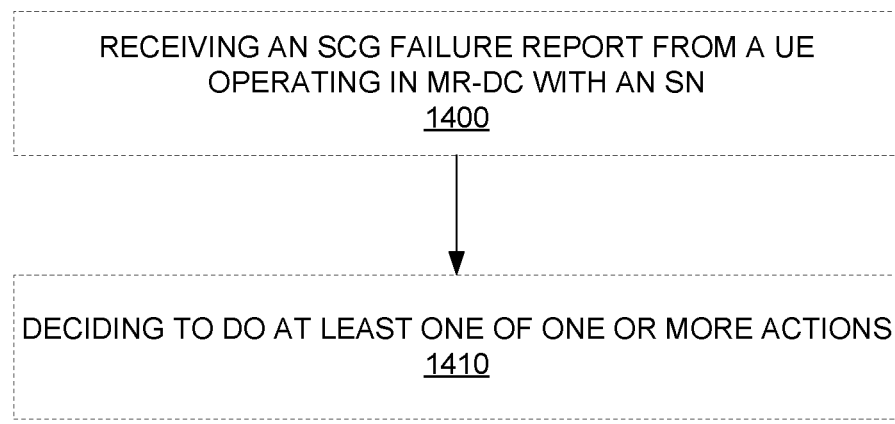
FIG. 14 is a logic flow diagram of a method performed by a MN network node according to some embodiments.

FIG. 14 shows a method at an MN network node (also called gNodeB). The method comprises one or more of the following steps. The method comprises receiving an SCG failure report from a UE operating in MR-DC with an SN (Block 1400).

The method may further comprise deciding to do at least one of one or more actions (Block 1410). The one or more actions may include releasing the SCG without configuring conditional PSCell addition to the UE. In that case, the MN sends to the UE a release of configuration, and, assuming the UE has released conditional PSCell change configurations, the MN does not need to explicitly delete it.

Alternatively or additionally, the one or more actions may include releasing the SCG and configuring conditional PSCell addition to the UE. In that case, the MN sends to the UE a release of configuration, and, assuming the UE has released conditional PSCell change configurations, the MN explicitly adds conditional PSCell addition configurations that it wants to.

Alternatively or additionally, the one or more actions may include reconfiguring the SCG without configuring conditional PSCell change to the UE. In that case the MN sends to the UE a reconfiguration of the SCG, and, assuming the UE has released conditional PSCell change configurations, the MN does not need to explicitly delete it.

Alternatively or additionally, the one or more actions may include reconfiguring the SCG and configuring conditional PSCell change to the UE. In that case, the MN sends to the UE a reconfiguration of the SCG, and, assuming the UE has released conditional PSCell change configurations, the MN explicitly adds conditional PSCell change configurations that it wants to.

Suspending and Resuming PSCell Change Configurations Upon SCG Failure (Delta Signaling)

Figure 15:
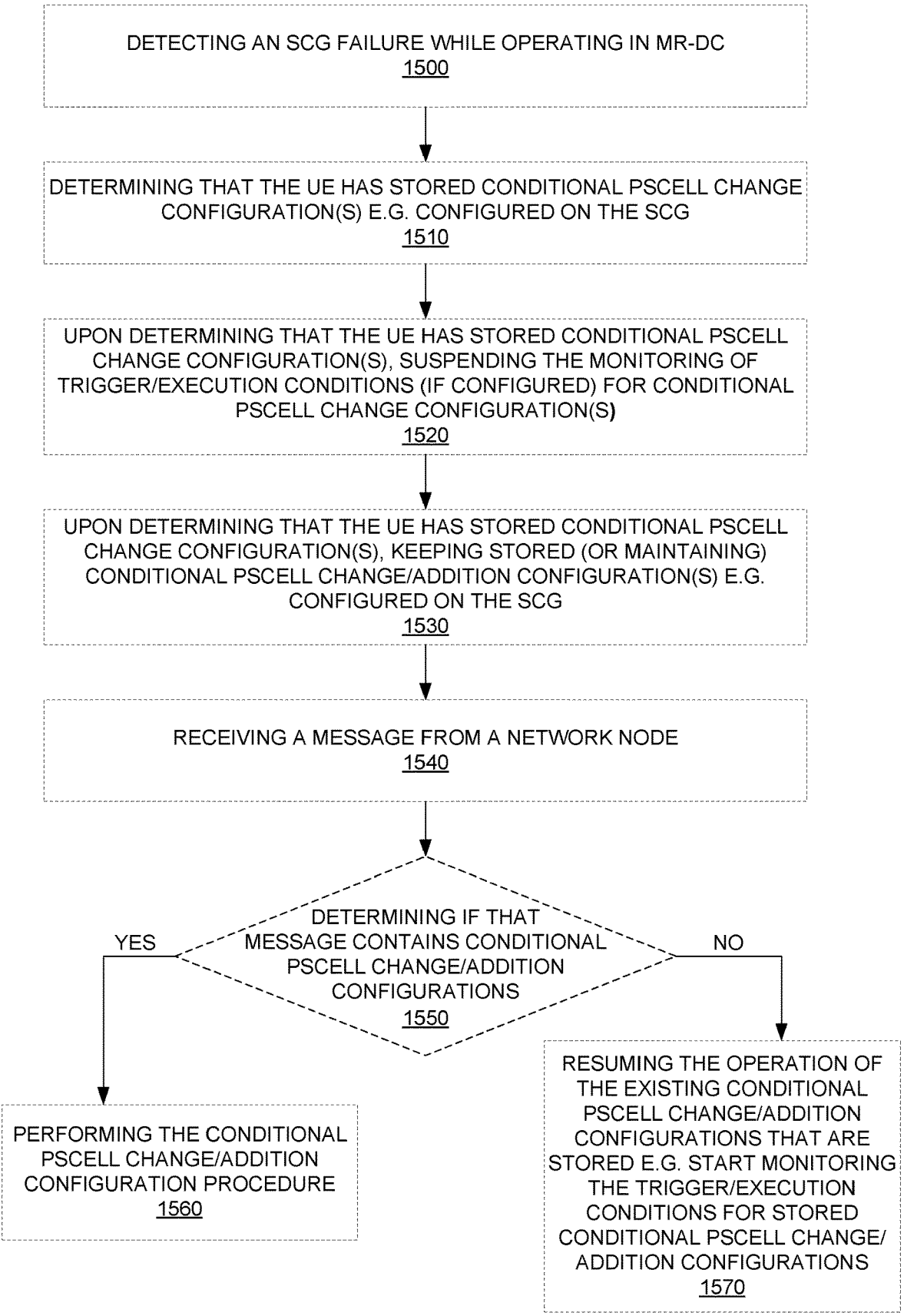
FIG. 15 is a logic flow diagram of a method performed by a wireless terminal according to some embodiments.

FIG. 15 shows a method at a wireless terminal (also called a User Equipment—UE). The method comprising one or more of the following steps. The method may comprise detecting an SCG failure while operating in MR-DC (Block 1500). The method may also comprise determining that the UE has stored conditional PSCell change configuration(s) e.g. configured on the SCG (Block 1510).

The method may further comprise, upon determining that the UE has stored conditional PSCell change configuration(s), suspending the monitoring of trigger/execution conditions (if configured) for conditional PSCell change configuration(s) e.g. configured on the SCG (Block Z620). This may avoid the UE to perform unnecessary measurements and/or avoid the UE to trigger/execute conditional PSCell change while the network is possibly handling the SCG failure.

Alternatively or additionally, the method may further comprise, upon determining that the UE has stored conditional PSCell change configuration(s), keeping stored (or maintaining) conditional PSCell change/addition configuration(s) e.g. configured on the SCG (Block 1530). This may be done to benefit from signaling reduction in an RRCReconfiguration after SCG failure report on the MN, in case the MN wants to configure conditional PSCell addition and/or conditional PSCell changes for the UE that has reported an SCG failure. Thanks to the method, then, it is possible to apply delta signaling on the stored configuration (e.g. only add new Conditional PSCell change/addition configurations for new target candidates in addition to the ones already stored and/or modify trigger/execution conditions for stored Conditional PSCell change/addition configurations, explicitly remove a subset of the target candidates, etc.). To make that possible, one needs to avoid any configurations mismatch between the UE and the network/MN (i.e. both UE and network needs to have the same understanding of UE's current configurations so delta signaling may be applied in an RCReconfiguration message at the MN after an SCG failure report). Hence, conditional PSCell change/addition configurations should be part of the UE context that should be available to the MN on SCG failure reporting and/or provided beforehand when the conditional PSCell change configurations were being prepared by the target candidates. One advantage of this approach is signaling reduction if MN or new/old SN wants to configure conditional PSCell change/addition for a UE reporting an SCG failure.

In any event, the method may alternatively or additionally comprise receiving a message from a network node (e.g. MN transmitting an RRCReconfiguration after having received an SCG failure report from the UE) (1540) and determining if that message contains conditional PSCell change/addition configurations (Block 1550).

If the message contains conditional PSCell change/addition configurations (e.g. AddMod/Remove lists for conditional PSCell change/addition) (YES at Block 1550), the method may comprise performing the conditional PSCell change/addition configuration procedure (Block 1560). For example, if a remove list is present, the method may comprise removing any stored configuration as indicated in the remove list and stopping performing actions related to conditional PSCell change/addition trigger/execution conditions monitoring. If AddMod list is present and a new element is present, the method may comprise adding new conditional PSCell change/addition configurations and starting performing the monitoring of conditional PSCell change/addition trigger/execution conditions accordingly. If an existing element is present i.e. referenced by a stored configuration identifier, the method may comprise performing the modification procedure associated to that configuration identifier e.g. replace the measurement identifier(s) associated to the trigger/execution condition(s) and/or replace the stored RRCReconfiguration in the OCTET STRING. Else if the message does not contain conditional PSCell change/addition configurations (NO at Block 1550), the method may comprise resuming the operation of the existing conditional PSCell change/addition configurations that are stored e.g. start monitoring the trigger/execution conditions for stored conditional PSCell change/addition configurations (Block 1570).

Figure 16:
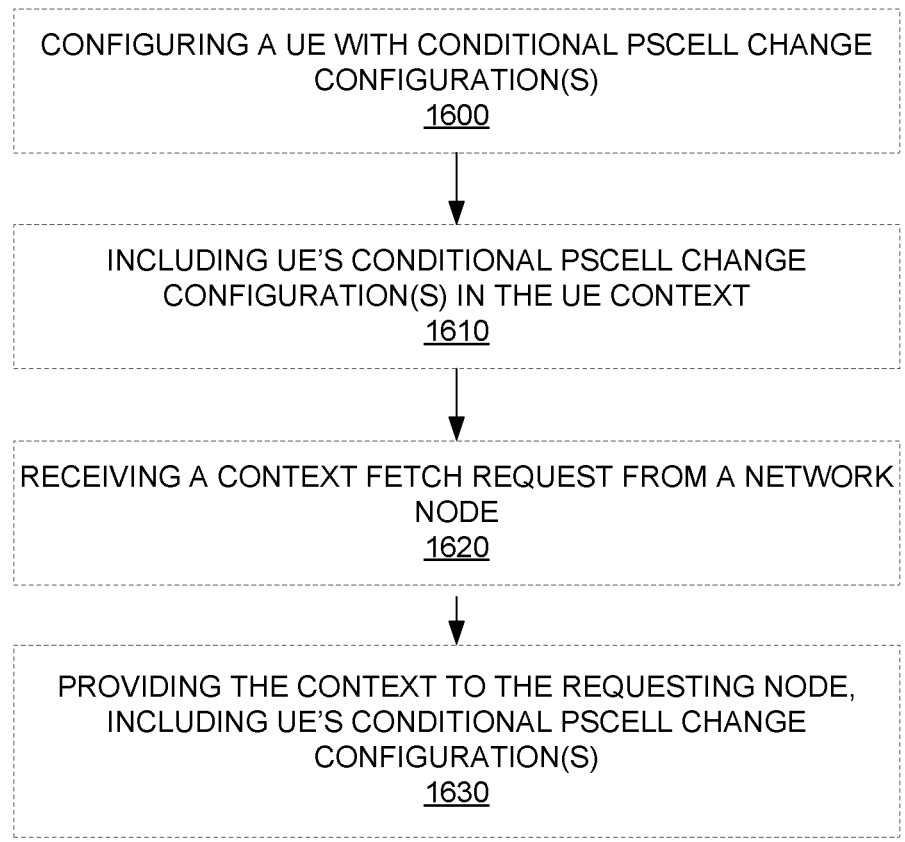
FIG. 16 is a logic flow diagram of a method performed by a SN network node according to some embodiments.

FIG. 16 shows a method at an SN network node (also called gNodeB). The method comprising one or more of the following steps. The method may comprise configuring a UE with conditional PSCell change configuration(s) (Block 1600), and including UE's conditional PSCell change configuration(s) in the UE Context (Block 1610), i.e. if there is a request from another node to fetch/obtain the UE context, Conditional PSCell change configurations are included. The method may also include receiving a context fetch request from a network node (e.g. an MN) for a UE with stored conditional PSCell change configuration(s) (Block 1620) and, providing the context to the requesting node (e.g. an MN) including UE's conditional PSCell change configuration(s) i.e. these configurations are considered part of the UE context (Block 1630).

Figure 17:
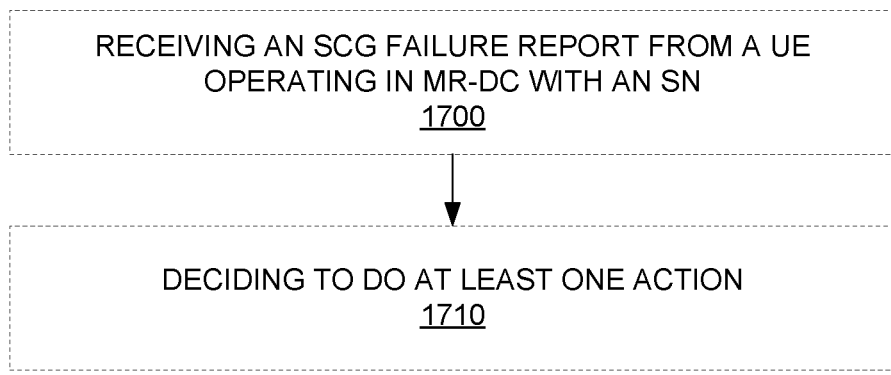
FIG. 17 is a logic flow diagram of a method performed by a MN network node according to some embodiments.

FIG. 17 shows a method at an MN network node (also called gNodeB). The method comprises one or more of the following steps. The method may comprise receiving an SCG failure report from a UE operating in MR-DC with an SN (Block 1700). The method may also comprise deciding to do at least action (Block 1710). The at least one action may be at least one action from among the following actions.

One action may be to release the SCG without configuring conditional PSCell addition to the UE. In that case the MN sends to the UE a release of configuration, and, assuming the UE has stored conditional PSCell change configurations, the MN explicitly removes conditional PSCell addition/change configurations.

Another action may be to release the SCG and configure conditional PSCell addition to the UE. In that case the MN sends to the UE a release of configuration, and, assuming the UE has stored conditional PSCell change configurations, the MN can explicitly remove conditional PSCell addition configurations.

Yet another action may be to reconfigure the SCG without configuring conditional PSCell change to the UE. In that case, the MN sends to the UE a reconfiguration of the SCG, and, assuming the UE has stored conditional PSCell change configurations, the MN explicitly deletes/removes conditional PSCell addition/change configuration(s).

Finally, another action may be to reconfigure the SCG and configure conditional PSCell change to the UE. In that case, the MN sends to the UE a reconfiguration of the SCG, and, assuming the UE has stored conditional PSCell change configurations, the MN explicitly adds and/or removes and/or modifies conditional PSCell change configurations that it wants to.

Deleting Conditional Handover Configurations Upon MCG Failure

Figure 18:
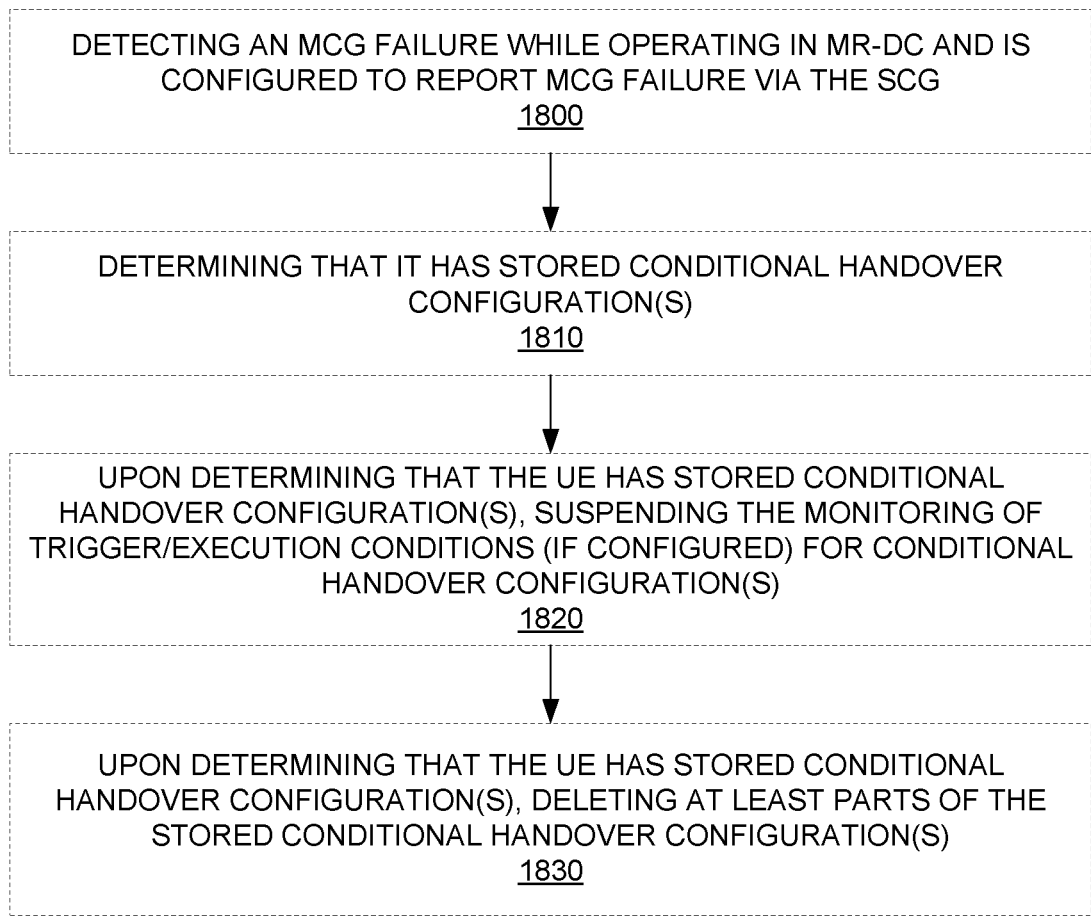
FIG. 18 is a logic flow diagram of a method performed by a wireless terminal according to some embodiments.

FIG. 18 shows a method at a wireless terminal (also called a User Equipment—UE). The method comprises one or more of the following steps. The method may comprise detecting an MCG failure while operating in MR-DC and is configured to report MCG failure via the SCG (Block 1800). The method may also comprise determining that the UE has stored conditional handover configuration(s) (Block 1810).

The method may also comprise, upon determining that the UE has stored conditional handover configuration(s), suspending the monitoring of trigger/execution conditions (if configured) for conditional handover configuration(s) (Block 1820). This may be done to avoid the UE to perform unnecessary measurements and/or to avoid the UE to trigger/execute conditional handover while the network is possibly handling the MCG failure.

The method may alternatively or additionally comprise, upon determining that the UE has stored conditional handover configuration(s), deleting at least parts of the stored conditional handover configuration(s) (Block 1830). This may be done to avoid configurations mismatch between the UE and the network.

For example, the deleting/releasing part of could comprise releasing one or more of the following parts of the conditional handover configuration: measurement configurations (measConfig), higher layer configurations (e.g., Packet Data Convergence Protocol, PDCP, and/or Service Data Adaptation Protocol, SDAP, configurations (RadiobearerConfig)), lower layer configurations (e.g., MAC, Radio Link Control (RLC), Physical (PHY) (CellgroupConfig), or trigger thresholds for the conditional configurations. This may be done to avoid any configurations mismatch between the UE and the network (i.e. both UE and network has same understanding of UE's current configurations so delta signaling may be applied in an RRCReconfiguration message from the MN following up an MCG failure report to the MN). For example, in case the MN need to provide an updated conditional handover configuration to the UE. One advantage of this approach is signaling reduction if the target wants to configure CHO for a UE after the MCG failure.

Figure 19:
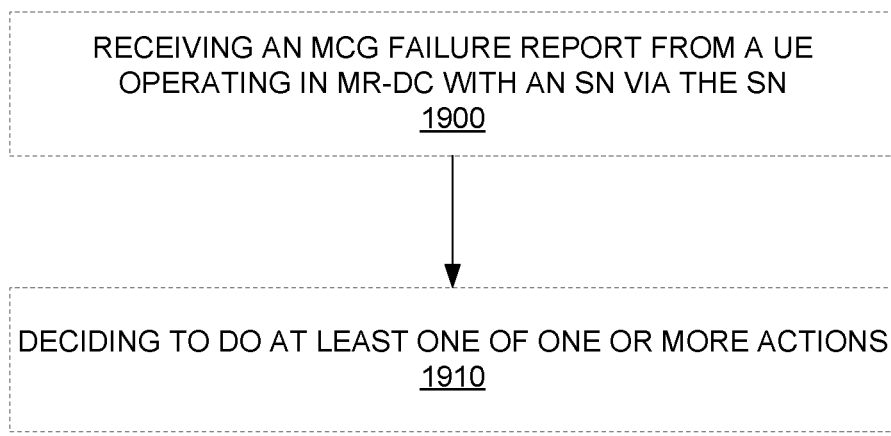
FIG. 19 is a logic flow diagram of a method performed by a MN network node according to some embodiments.

FIG. 19 shows a method at an MN network node (also called gNodeB). The method comprises one or more of the following steps. The method comprises receiving an MCG failure report from a UE operating in MR-DC with an SN via the SN (Block 1900). The method may also comprise deciding to do at least one action (Block 1910). The action may be at least one of the following actions.

One action may be to reconfigure the MCG (or perform a handover) without configuring conditional handover to the UE. In that case, the MN sends to the UE a reconfiguration of the MCG, and, assuming the UE has released conditional handover configurations, the MN does not need to explicitly delete it.

Another action may be to reconfigure the MCG (or perform a handover) and configure conditional handover configurations to the UE. In that case, the MN sends to the UE a reconfiguration of the MCG, and, assuming the UE has released conditional handover configurations, the MN explicitly adds conditional handover configurations that it wants to.

Suspending and Resuming Conditional Handover Configurations Upon MCG Failure (Delta Signaling)

Figure 20:
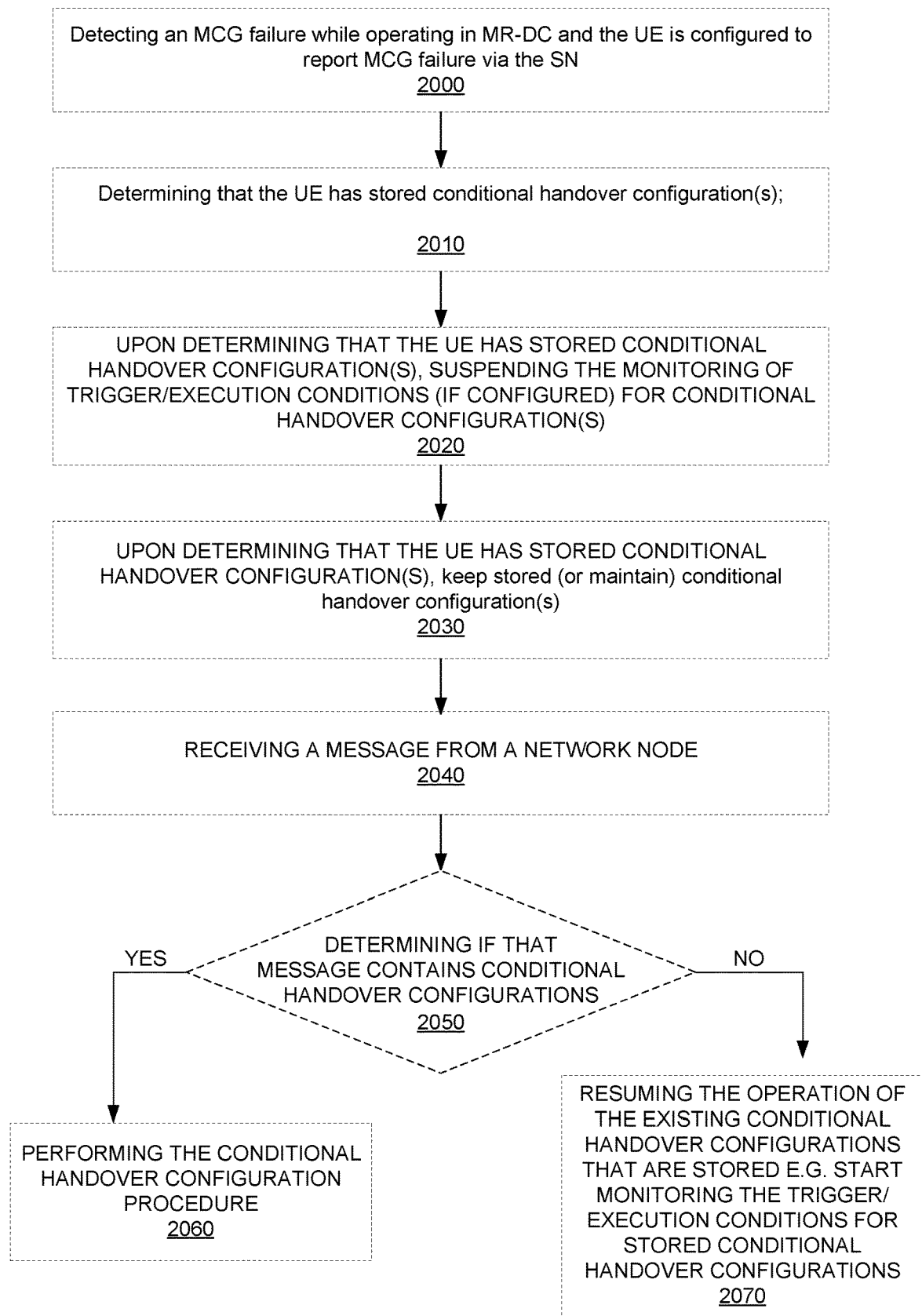
FIG. 20 is a logic flow diagram of a method performed by a wireless terminal according to some embodiments.

FIG. 20 shows a method at a wireless terminal (also called a User Equipment—UE). The method comprises one or more of the following steps. The method may comprise detecting an MCG failure while operating in MR-DC and the UE is configured to report MCG failure via the SN (Block 2000). The method may further comprise determining that the UE has stored conditional handover configuration(s) (Block 2010).

The method may also comprise, upon determining that the UE has stored conditional handover configuration(s), suspending the monitoring of trigger/execution conditions (if configured) for conditional handover configuration(s) (Block 2020). This may be done to avoid the UE to perform unnecessary measurements and/or to avoid the UE to trigger/execute conditional handover while the network is possibly handling the MCG failure.

The method may further comprise, upon determining that the UE has stored conditional handover configuration(s), keeping stored (or maintaining) conditional handover configuration(s) (Block 2030). This may be done to benefit from signaling reduction in an RRCReconfiguration after MCG failure report on the MN, in case the MN wants to configure conditional handover for the UE that has reported an MCG failure. Thanks to the method, it is possible to apply delta signaling on the stored configuration (e.g. only add new Conditional handover configurations for new target candidates in addition to the ones already stored and/or modify trigger/execution conditions for stored Conditional handover configurations, explicitly remove a subset of the target candidates, etc.). To make that possible, one needs to avoid any configurations mismatch between the UE and the network/MN (i.e. both UE and network needs to have the same understanding of UE's current configurations so delta signaling may be applied in an RRCReconfiguration message at the MN after an MCG failure report). Hence, conditional handover configurations should be part of the UE context that should be available to the MN on SCG failure reporting and/or provided beforehand when the conditional handover configurations were being prepared by the target candidates. One advantage of this approach is signaling reduction if MN wants to configure conditional handover for a UE reporting an MCG failure.

In any event, the method may also comprise receiving a message from a network node (e.g. MN transmitting an RRCReconfiguration after having received an MCG failure report from the UE via the SN) (Block 2040). The method may further comprise determining if that message contains conditional handover configurations (Block 2050).

If the message contains conditional handover configurations (e.g. AddMod/Remove lists for conditional handover) (YES at Block 2050), the method may comprise performing the conditional handover configuration procedure (Block 2060). For example, if a remove list is present, the method may comprise removing any stored configuration as indicated in the remove list and stopping performing actions related to conditional handover trigger/execution conditions monitoring. Or, if AddMod list is present and a new element is present, the method may comprise adding new conditional handover configurations and starting performing the monitoring of conditional handover trigger/execution conditions accordingly. Or, if AddMod list is present and an existing element is present i.e. referenced by a stored configuration identifier, the method may comprise performing the modification procedure associated to that configuration identifier e.g. replace the measurement identifier(s) associated to the trigger/execution condition(s) and/or replace the stored RRCReconfiguration in the OCTET STRING.

Else if the message does not contain conditional handover configurations (NO at Block 2050), the method may comprise resuming the operation of the existing conditional handover configurations that are stored e.g. start monitoring the trigger/execution conditions for stored conditional handover configurations (Block 2070).

Figure 21:
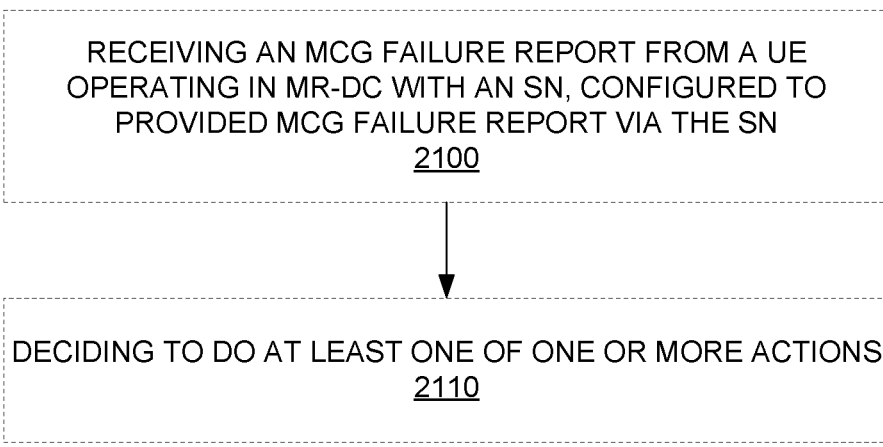
FIG. 21 is a logic flow diagram of a method performed by a MN network node according to some embodiments.

FIG. 21 shows a method at an MN network node (also called gNodeB). The method comprising one or more of the following steps. The method may comprise receiving an MCG failure report from a UE operating in MR-DC with an SN, configured to provided MCG failure report via the SN (Block 2100). The method may also comprise deciding to do at least one of one or more actions (Block 2110). The one or more actions may include one or more of the following actions.

One action may be to reconfigure the MCG (or perform a handover) without configuring conditional handover to the UE. In that case the MN sends to the UE a reconfiguration of the MCG, and, assuming the UE has stored conditional handover configurations, the MN explicitly deletes/removes conditional handover configuration(s).

Another action may be to reconfigure the MCG (or perform a handover) and configure conditional handover to the UE. In that case, the MN sends to the UE a reconfiguration of the MCG, and, assuming the UE has stored conditional handover configurations, the MN explicitly adds and/or removes and/or modifies conditionalhandover configurations that it wants to.

Certain embodiments may provide one or more of the following technical advantage(s). One advantage of reporting conditional PSCell addition/change and/or conditional handover information in an SCG failure or MCG failure report is that it provided more assistance to the network to take further actions upon reception of an SCG failure or MCG failure report, such as whether it should release the SCG/CHO configurations, resume the SCG operation, resume the monitoring of trigger/execution conditions for the stored configurations, etc. That may also enable a reduction in terms of signaling over the air interface e.g. if the network decides to resume the monitoring of the trigger/execution conditions for the stored conditional PSCell addition/change and/or conditional handover.

Consider now additional aspects of conditional PSCell configuration handling upon SCG failure.

In one embodiment, the UE receives conditional PSCell change configuration(s) from the network while it is configured with MR-DC (i.e. it is configured with a current SCG configuration). If the UE detects a failure on the SCG, it will trigger an SCG failure handling, i.e. it will send a SCG failure report to the network.

Figure 22:
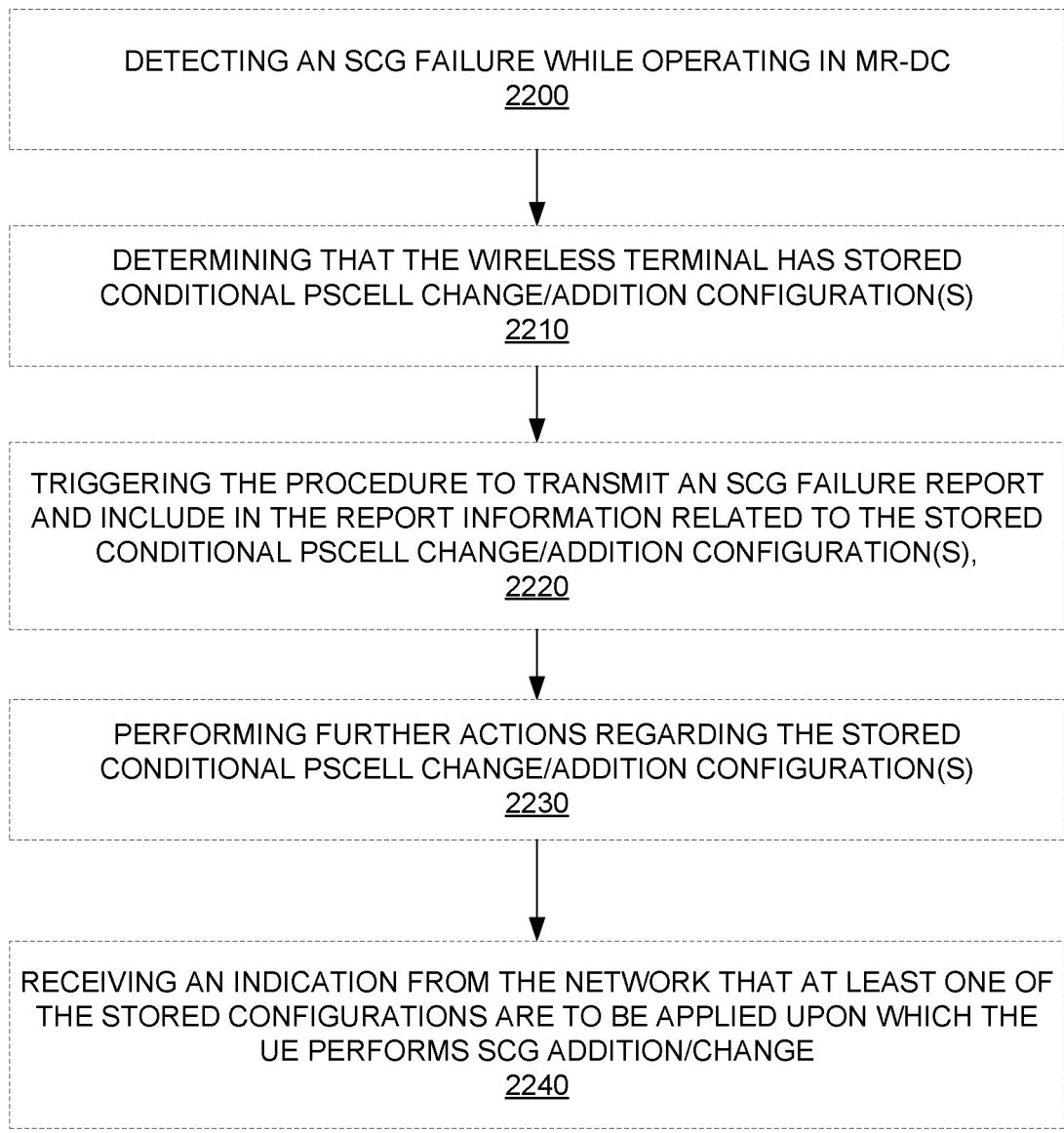
FIG. 22 is a logic flow diagram of a method performed by a wireless terminal according to some embodiments.

FIG. 22 shows one embodiment that comprises a method at a wireless terminal (also called a User Equipment—UE). The method comprises one or more of the following actions. As shown, the method may comprise detecting an SCG failure while operating in MR-DC (Block 2200). The method may also comprise determining that the wireless terminal has stored conditional PSCell change/addition configuration(s) (Block 2210).

In some embodiments, the method may comprise triggering the procedure to transmit an SCG failure report and include in the report information related to the stored conditional PSCell change/addition configuration(s) (Block

2220). The information may be at least one of the following. The information may be a cell identity for the cells the UE has stored PSCell change configuration (i.e. a stored RRCReconfiguration with reconfigurationWithSync in an OCTET STRING). Alternatively or additionally, the information may be downlink frequency information for the cells the UE has stored PSCell change configuration (i.e. a stored RRCReconfiguration with reconfigurationWithSync in an OCTET STRING). Alternatively or additionally, the information may be trigger/execution conditions. Alternatively or additionally, the information may be measurements performed while the UE was monitoring the trigger/Execution conditions for the configured conditional PSCell change. Alternatively or additionally, the information may be an indication indicating that a given cell for which the UE is including measurements in the SCG failure report is a cell that the UE has stored conditional PSCell change configuration.

In any event, the method may comprise performing further actions regarding the stored conditional PSCell change/addition configuration(s) (Block 2230). In one variant, these stored conditional PSCell change/addition configuration(s) are deleted upon the detection of an SCG failure. Hence, they are not considered as part of the SCG configurations that are possibly used as baseline for delta signaling from the MN e.g. after the transmission of the SCG failure report. In another variant, these stored conditional PSCell change/addition configuration(s) are suspended upon the detection of an SCG failure. Hence, they are considered as part of the SCG configurations that are possibly used as baseline for delta signaling from the MN e.g. after the transmission of the SCG failure report. So, after SCG failure is detected, the UE may receive (e.g. from the MN) a message resuming the operation of an SCG including the resume of the operation of the conditional PSCell change configurations.

Regardless, the method may comprise receiving an indication from the network that at least one of the stored configurations are to be applied upon which the UE performs SCG addition/change (Block 2240).

One example of how the method in FIG. 22 could be implemented in the 3GPP RRC specifications is shown below. Some embodiments in this regard define a flag in the list of reported cells indicating whether the UE has a stored RRCReconfiguration or not for that cell, as shown below:

---

SCGFailureInformation message

```
-- ASN1START
-- TAG-SCGFAILUREINFORMATION-START
SCGFailureInformation ::=           SEQUENCE {
    criticalExtensions                  CHOICE {
        scgFailureInformation               SCGFailureInformation-IEs,
        criticalExtensionsFuture            SEQUENCE { }
    }
}
SCGFailureInformation-IEs ::=       SEQUENCE {
    failureReportSCG                    FailureReportSCG            OPTIONAL,
    nonCriticalExtension                SEQUENCE { }                OPTIONAL
}
FailureReportSCG ::=                SEQUENCE {
    failureType                         ENUMERATED {
                                            t310-Expiry, randomAccessProblem,
                                            rlc-MaxNumRetx,
                                            synchReconfigFailureSCG, scg-ReconfigFailure,
                                            srb3-IntegrityFailure, spare2,
spare1},
    measResultFreqList                  MeasResultFreqList          OPTIONAL,
    measResultSCG-Failure               OCTET STRING (CONTAINING MeasResultSCG-
Failure)                            OPTIONAL,
    ...,
    [[
    storedCondReconf                    BOOLEAN                     OPTIONAL
    ]]
}
MeasResultFreqList ::=              SEQUENCE (SIZE (1..maxFreq)) OF MeasResult2NR
-- TAG-SCGFAILUREINFORMATION-STOP
-- ASN1STOP
```

---

SCGFailureInformation field descriptions measResultFreqList
  The field contains available results of measurements on NR frequencies the UE is configured to measure by measConfig.
measResultSCG-Failure
  The field contains the MeasResultSCG-Failure IE which includes available results of measurements on NR frequencies the UE is configured to measure by the NR SCG RRCReconfiguration message.
storedCondReconf
  The field indicates whether a cell being reported is a cell for which the UE has a stored RRCReconfiguration with reconfigurationWithSync.

5.7.3.4 Setting the Contents of MeasResultSCG-Failure

The UE shall set the contents of the MeasResultSCG-Failure as follows:

1> for each MeasObjectNR configured on NR SCG for which a measId is configured and measurement results are available:
  2> include an entry in measResultsPerMOList;
  2> if there is a measId configured with the MeasObjectNR and a reportConfig which has rsType set to ssb:
    3> set ssbFrequency to the value indicated by ssbFrequency as included in the MeasObjectNR;
  2> if there is a measId configured with the MeasObjectNR and a reportConfig which has rsType set to csi-rs:
    3> set refFreqCSI-RS to the value indicated by refFreqCSI-RS as included in the associated measurement object;
  2> if a serving cell is associated with the MeasObjectNR:
    3> set measResultServingCell to include the available quantities of the concerned cell and in accordance with the performance requirements in TS 38.133 [14];
  2> set the measResultNeighCellList to include the best measured cells, ordered such that the best cell is listed first, and based on measurements collected up to the moment the UE detected the failure, and set its fields as follows;
    3> ordering the cells with sorting as follows:
      4> based on SS/PBCH block if SS/PBCH block measurement results are available and otherwise based on CSI-RS;
      4> using RSRP if RSRP measurement results are available, otherwise using RSRQ if RSRQ measurement results are available, otherwise using SINR;
    3> for each neighbour cell included:
      4> include the optional fields that are available.
      4> if the cell is a cell for which the UE has a stored RRCReconfiguration (i.e. conditional PSCell change configuration):
        5> set the field storedCondReconf to true;

NOTE: The measured quantities are filtered by the L3 filter as configured in the mobility measurement configuration. The measurements are based on the time domain measurement resource restriction, if configured. Blacklisted cells are not required to be reported.

In another embodiment, the UE suspends the monitoring of the conditional PSCell configuration and releases the conditional PSCell configurations upon initiating an SCG failure information procedure as seen below:

5.7.3 SCG Failure Information
[ . . . ]

5.7.3.2 Initiation

A UE initiates the procedure to report SCG failures when SCG transmission is not suspended and when one of the following conditions is met:

1> upon detecting radio link failure for the SCG, in accordance with subclause 5.3.10.3;
1> upon reconfiguration with sync failure of the SCG, in accordance with subclause 5.3.5.8.3;
1> upon SCG configuration failure, in accordance with subclause 5.3.5.8.2;
1> upon integrity check failure indication from SCG lower layers concerning SRB3.

Upon initiating the procedure, the UE shall:
1> suspend SCG transmission for all SRBs and DRBs;
1> suspend the monitoring of conditional PSCell addition/change trigger/execution conditions;
1> reset SCG MAC;
1> release conditional PSCell addition/change configuration(s);
1> stop T304, if running;
1> if the UE is in (NG)EN-DC:
  2> initiate transmission of the SCGFailureInformationNR message as specified in TS 36.331 [10], clause 5.6.13a.
1> else:
  2> initiate transmission of the SCGFailureInformation message in accordance with 5.7.3.5.

Conditional Handover Configuration Handling Upon MCG Failure

In another embodiment, the UE receives conditional handover configuration(s) from the network while it is configured with MR-DC (i.e. it is configured with a current SCG configuration) and configured to perform MCG failure handling (i.e. it is configured with SRB3 or a split SRB1 and is configured with MCG failure handling). If the UE detects a failure on the MCG, it will trigger an MCG failure handling, i.e. it will send an MCG failure report to the network via the SCG part of the split SRB1 or via SRB3.

Figure 23:
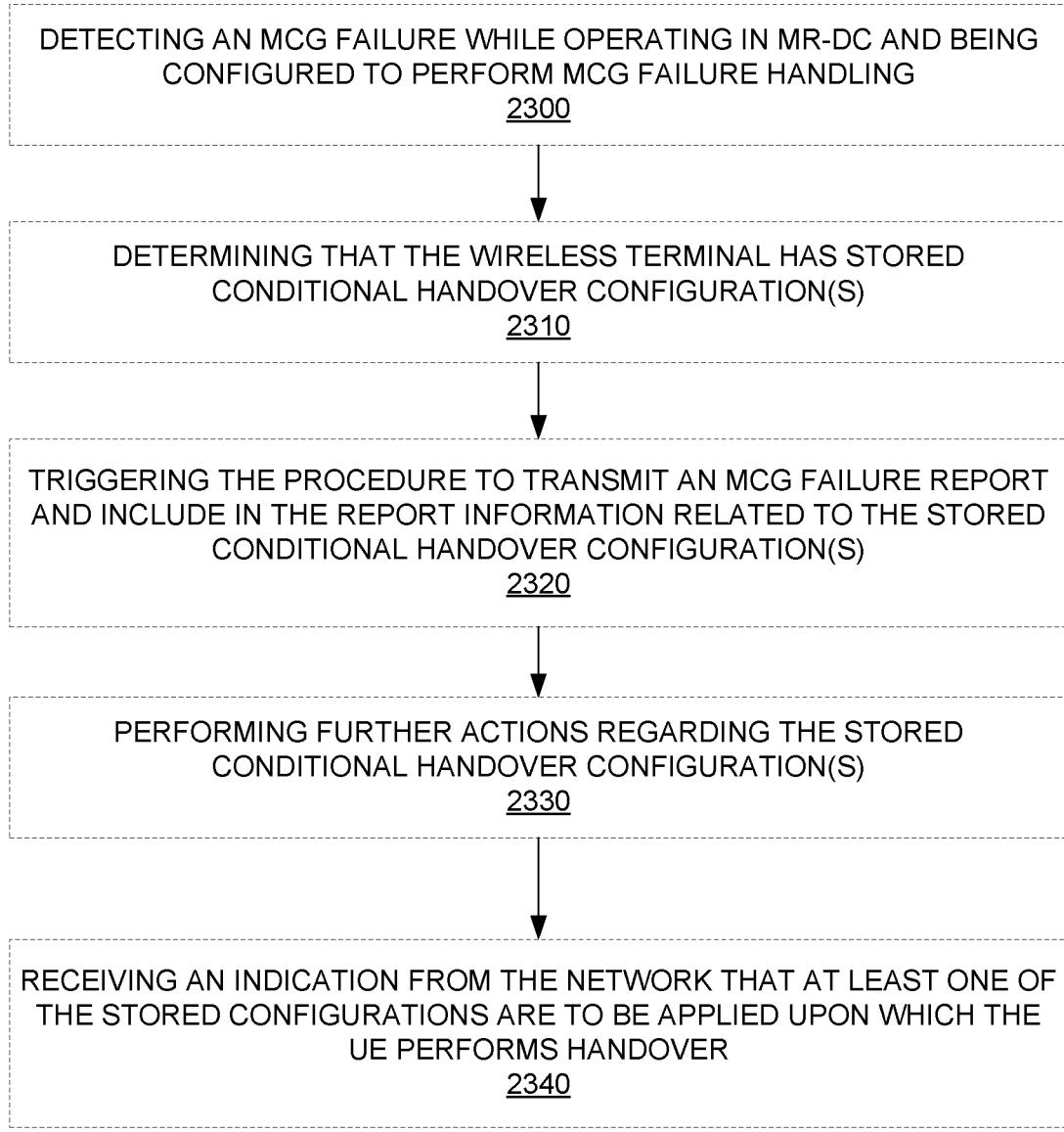
FIG. 23 is a logic flow diagram of a method performed by a wireless terminal according to some embodiments.

FIG. 23 shows one embodiment that comprises a method at a wireless terminal (also called a User Equipment—UE). The method comprises one or more of the following. The method may comprise detecting an MCG failure while operating in MR-DC and being configured to perform MCG failure handling (Block 2300). The method may also comprise determining that the wireless terminal has stored conditional handover configuration(s) (Block 2310).

In some embodiments, the method comprises triggering the procedure to transmit an MCG failure report and include in the report information related to the stored conditional handover configuration(s) (Block 2320). The information may be at least one of the following. The information may be a cell identity for the cells the UE has stored conditional handover configuration (i.e. a stored RRCReconfiguration with reconfigurationWithSync in an OCTET STRING). The information may be downlink frequency information for the cells the UE has stored conditional handover configuration (i.e. a stored RRCReconfiguration with reconfigurationWithSync in an OCTET STRING). The information may be trigger/execution conditions. The information may be measurements performed while the UE was monitoring the trigger/Execution conditions for the configured conditional handover. The information may be an indication indicating that a given cell for which the UE is including measurements in the MCG failure report is a cell that the UE has stored conditional handover configuration.

In some embodiments, the method further comprises performing further actions regarding the stored conditional handover configuration(s) (Block 2330). In one variant, these stored conditional handover configuration(s) are deleted upon the detection of an MCG failure. Hence, they are not considered as part of the MCG configurations that are possibly used as baseline for delta signaling from the MN e.g. after the transmission of the MCG failure report. In another variant, these stored conditional handover configuration(s) are suspended upon the detection of an MCG failure. Hence, they are considered as part of the MCG configurations that are possibly used as baseline for delta signaling from the MN e.g. after the transmission of the MCG failure report; So, after MCG failure is detected, UE may receive (e.g. from the MN via the SN on split SRB1 or SRB3) a message resuming the operation of an MCG including the resume of the operation of the conditional handover configurations.

The method as show may also comprise receiving an indication from the network that at least one of the stored configurations are to be applied upon which the UE performs handover (Block 2340). If the UE has been configured with conditional PSCell addition/change configurations when the MN receives the MCG failure report, the MN can instruct the UE to apply the conditional PSCell add/mod configurations as a handover configuration.

If the UE is configured with both conditional handover configurations and conditional PSCell addition/change configurations when it experiences a MCG failure, the UE may treat both configurations equally, (i.e. suspend/resume both, or release both) or it can handle the configurations independently (i.e. suspend/resume one of them and release the other). The actions the UE will take could either be specified in the standards, e.g. based on UE capability, or configurable by the network.

One example of how the method could be implemented in the RRC specifications is shown below, where a flag is defined in the list of reported cells indicating whether the UE has a stored RRCReconfiguration or not for that cell, as shown below:

| MCGFailureInformation message |
| --- |
| -- ASN1START<br>-- TAG-MCGFAILUREINFORMATION-START<br>MCGFailureInformation-r16 ::=    SEQUENCE {<br>    criticalExtensions                CHOICE {<br>        mcgFailureInformation-r16        MCGFailureInformation-r16-IEs,<br>        criticalExtensionsFuture         SEQUENCE { }<br>    }<br>}<br>MCGFailureInformation-r16-IEs ::=    SEQUENCE {<br>    failureReportMCG-r16             FailureReportMCG-r16        OPTIONAL,<br>    nonCriticalExtension             SEQUENCE { }              OPTIONAL<br>}<br>FailureReportMCG-r16 ::=              SEQUENCE {<br>    failureType-r16                  ENUMERATED {<br>        t310-Expiry, randomAccessProblem,<br>        rlc-MaxNumRetx, spare},<br>    measResultFreqList-r16           MeasResultList2NR,          OPTIONAL,<br>    measResultFreqListEUTRA-r16      MeasResultList2EUTRA        OPTIONAL,<br>    measResultSCG-r16                OCTET-STRING (CONTAINING MeasResultSCG-Failure)   OPTIONAL,<br>    measResultSCG-EUTRA-r16          OCTET-STRING                OPTIONAL,<br>    ...,<br>    [[<br>    storedCondReconf                 BOOLEAN                     OPTIONAL<br>    ]]<br>}<br>MeasResultList2NR ::=            SEQUENCE (SIZE (1..maxFreq)) OF MeasResult2NR<br>MeasResultList2EUTRA ::=         SEQUENCE (SIZE (1..maxNrofServingCellsEUTRA)) OF MeasResult2EUTRA<br>-- TAG-MCGFAILUREINFORMATION-STOP<br>-- ASN1STOP |

| MCGFailureInformation field descriptions |
| --- |
| measResultFreqList<br>  The field contains available results of measurements on NR frequencies the UE is configured to measure by the measConfig associated with the MCG.<br>measResultFreqListEUTRA<br>  The field contains available results of measurements on E-UTRA frequencies the UE is configured to measure by measConfig associated with the MCG.<br>measResultSCG<br>  The field contains the MeasResultSCG-Failure IE which includes available measurement results on NR frequencies the UE is configured to measure by the measConfig associated with the SCG.<br>measResultSCG-EUTRA<br>  The field contains the EUTRA MeasResultSCG-FailureMRDC IE which includes available results of measurements on E-UTRA frequencies the UE is configured to measure by the E-UTRA RRCConnectionReconfiguration message as specified in TS 36.331 [10].<br>storedCondReconf<br>  The field indicates whether a cell being reported is a cell for which the UE has a stored RRCReconfiguration with reconfigurationWithSync. |

5.7.y.4 Actions Related to Transmission of MCGFailureInformation Message

The UE shall set the contents of the MCGFailureInformation message as follows:

1> include and set failure Type in accordance with 5.7.y.3;
1> for each NR frequency the UE is configured to measure by a MeasConfig associated with the MCG and for which measurement results are available:
    2> set the measResultFreqList to include the best measured cells, ordered such that the best cell is listed first using RSRP to order if RSRP measurement results are available for cells on this frequency, otherwise using RSRQ to order if RSRQ measurement results are available for cells on this frequency, otherwise using SINR to order, and based on measurements collected up to the moment the UE detected the failure, and for each cell that is included, include the optional fields that are available;
1> if the UE is in NR-DC;
    2> include and set MeasResultSCG in accordance with 5.7.3.4;
1> if the UE is in NE-DC;
    2> for each EUTRA frequency the UE is configured to measure by measConfig for which measurement results are available:
        3> set the measResultFreqListEUTRA to include the best measured cells, ordered such that the best cell is listed first using RSRP to order if RSRP measurement results are available for cells on this frequency, otherwise using RSRQ to order if RSRQ measurement results are available for cells on this frequency, otherwise using SINR to order, and based on measurements collected up to the moment the UE detected the failure, and for each cell that is included, include the optional fields that are available;
    2> include and set MeasResultSCG-EUTRA in accordance with TS 36.331 [10] clause 5.6.13.5;
1> if SRB1 is configured as Split SRB and pdcp-Duplication is not configured;
    2> if primaryPath is set to a cell group ID corresponding to MCG;
        3> set primaryPath to a cell group ID corresponding to SCG;
1> if the cell is a cell for which the UE has a stored RRCReconfiguration (i.e. conditional handover configuration):
    2> set the field storedCondReconf to true;

The UE shall:
1> start timer Txxx;
1> submit the MCGFailureInformation message to lower layers for transmission.

In another embodiment, the UE suspends the monitoring of the conditional handover triggers and releases the conditional handover configurations upon triggering an MCG failure as seen below:

5.7.y MCG Failure Information

[ . . . ]

5.7.y.2 Initiation

A UE configured with split SRB1 or SRB3 initiates the procedure to report MCG failures when neither MCG nor SCG transmission is suspended and when the following condition is met:

1> upon detecting radio link failure of the MCG, in accordance with 5.3.10.3

Upon initiating the procedure, the UE shall:
1> suspend MCG transmission for all SRBs and DRBs;
1> suspend the monitoring of conditional handover trigger/execution conditions;
1> reset MCG-MAC;
1> release conditional handover configuration(s);
1> initiate transmission of the MCGFailureInformation message in accordance with 5.7.y.4.

The term handover or reconfiguration with sync may be used herein with a similar meaning. Hence, a conditional handover may also be called a conditional reconfiguration with sync. In NR terminology, the handovers are typically called an RRCReconfiguration with a reconfigurationWthSync (field containing configuration necessary to execute a handover). In LTE terminology, the handovers are typically called an RRCConnectionReconfiguration with a mobilityControlInfo (field containing configuration necessary to execute a handover). The term conditional PSCell change or addition is also used to refer to the case where the UE is configured with an RRCReconfiguration prepared by a target SCG candidate, either for SCG addition, if the UE is operating in single connectivity or SCG change if the UE is operating in MR-DC.

Most of the UE (and network) actions defined herein are described as being performed in NR or LTE. In other words, the configuration of a conditional PSCell change or addition received in NR for NR cells, UE detecting SCG RLF in an NR cell and reporting an SCG failure report to an NR cell. However, the method is also applicable when any of these steps occurs in different RATs, for example: the configuration of a conditional PSCell change or addition received in NR for LTE cells (that are SCG candidates), UE detecting SCG RLF in an NR cell and reporting an SCG failure report to an NR cell, including information on the LTE cells for which the UE has stored conditional PSCell change information.

Some embodiments are described in the context of conditional handover/conditional PSCell addition/change, which should not be seen as a limiting factor. The method may also be applicable for handovers triggered by the reception of an RRCReconfiguration message with a reconfigurationWithSync without any condition associated (or RRCConnectionReconfiguration with a mobilityControlInfo).

According to some embodiments, a UE configured with a set of conditional RRCReconfiguration(s) (e.g., conditional handover) shall execute a handover or PSCell addition/change (or conditional handover, depending how the procedure is going to be called in NR RRC specifications) when the condition for the handover is fulfilled.

Note here that conditional handover related configuration(s) may be for a cell, list of cell(s), measurement object(s) or frequencies. In the case of the cell association, they may be for the same radio access technology (RAT) or for a different RAT. For example, the "conditional handover related configuration(s)" for a cell may comprise at least the following:

An RRCReconfiguration like message (or any message with equivalent content), possibly containing a reconfigurationWithSync using NR terminology (defined in 3GPP Technical Specification (TS) 38.331) and prepared by target candidates. Or, using the E-UTRA terminology, an RRCConnectionReconfiguration with mobilityControlInfo (defined in TS 36.331);
    Triggering/execution condition(s) configuration e.g. something like A1-A6 or B1-B2 (inter-RAT events)

triggering events (as defined in TS 38.331/36.331 in reportConfig) where instead of triggering a measurement report it would trigger a conditional handover;

Optionally other conditional handover controlling parameters e.g. timer defining the validity of target candidate resources, etc.

In one example, this Conditional Handover and/or Conditional PSCell addition/change configuration per target candidate can be represented by the following signaling using the ASN.1 notation:

---
CondReconfigurationPerTargetCandidate information element
---

```
-- ASN1START
-- TAG-CONDRECONFIGURATIONPERTARGETCANDIDATE-START
CondReconfigurationPerTargetCandidate ::=    SEQUENCE {
    rrcReconfigurationToApply                OCTET STRING (CONTAINING RRCReconfiguration)
    triggerCondition                         SEQUENCE (SIZE (1.. K)) OF MeasId,
    ...
}
-- TAG- CONDRECONFIGURATIONPERTARGETCANDIDATE-STOP
-- ASN1STOP
```

Out of these, the most relevant configuration is indeed the RRCReconfiguration per target candidate the UE has been configured with, before the UE detects the SCG failure. That may have been provided to the UE by the network in an RRCReconfiguration message or in an RRCResume message.

Figure 24:
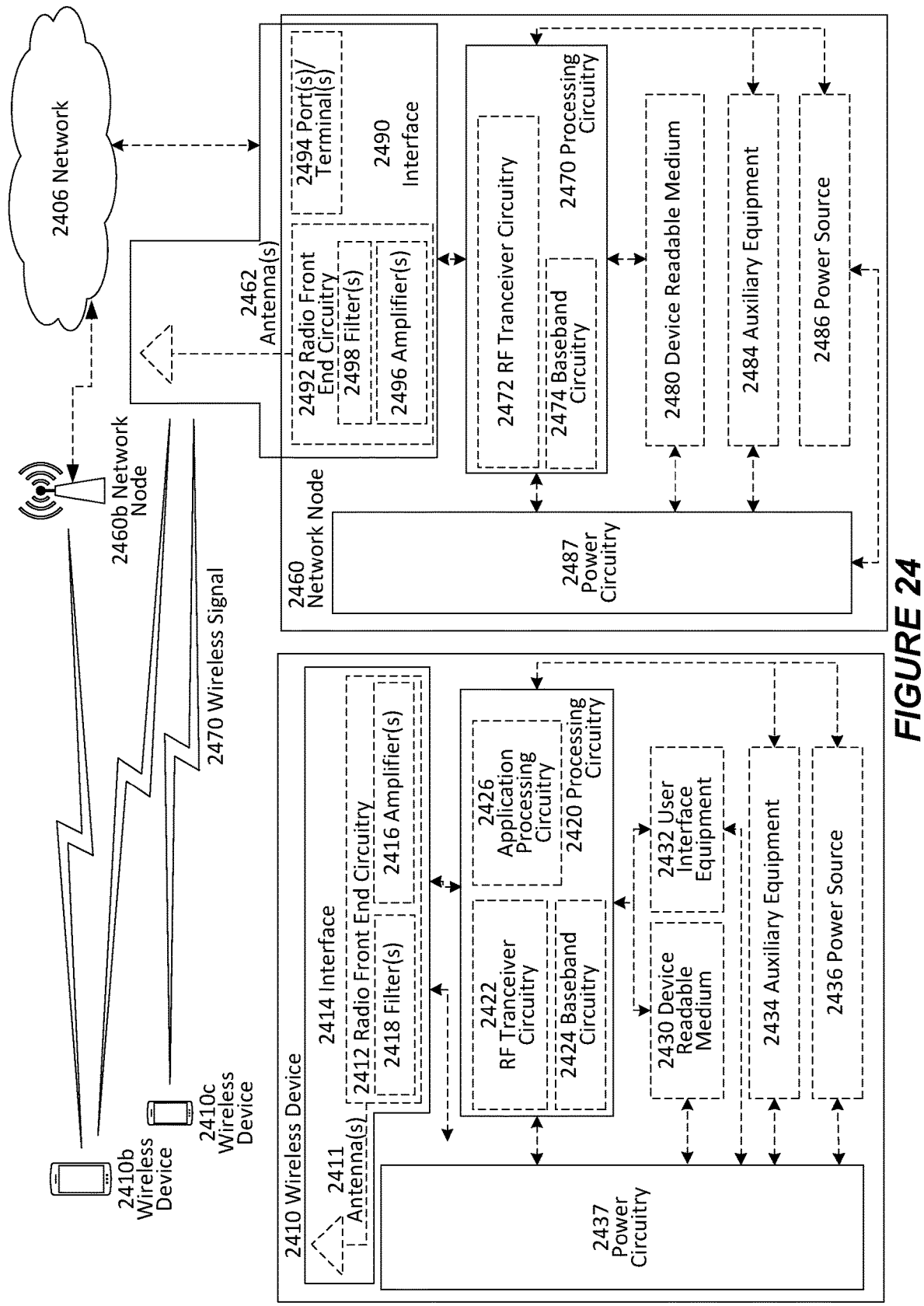
FIG. 24 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 24. For simplicity, the wireless network of FIG. 24 only depicts network 2406, network nodes 2460 and 2460b, and WDs 2410, 2410b, and 2410c. In practice, a wireless network may further include any additional elements suitable to support communication between wireless devices or between a wireless device and another communication device, such as a landline telephone, a service provider, or any other network node or end device. Of the illustrated components, network node 2460 and wireless device (WD) 2410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2460 and WD 2410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 24, network node 2460 includes processing circuitry 2470, device readable medium 2480, interface 2490, auxiliary equipment 2484, power source 2486, power circuitry 2487, and antenna 2462. Although network node 2460 illustrated in the example wireless network of FIG. 24 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 2460 are depicted as single boxes located within a larger box, or nested within multiple boxes, in practice, a network node may comprise multiple different physical components that make up a single illustrated component (e.g., device readable medium 2480 may comprise multiple separate hard drives as well as multiple RAM modules).

Similarly, network node 2460 may be composed of multiple physically separate components (e.g., a NodeB component and a RNC component, or a BTS component and a BSC component, etc.), which may each have their own respective components. In certain scenarios in which network node 2460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2460 may be configured to support multiple radio access technologies (RATs). In such embodiments, some components may be duplicated (e.g., separate device readable medium 2480 for the different RATs) and some components may be reused (e.g., the same antenna 2462 may be shared by the RATs). Network node 2460 may also include multiple sets of the various illustrated components for different wireless technologies integrated into network node 2460, such as, for example, GSM, WCDMA, LTE, NR, WiFi, or Bluetooth wireless technologies. These wireless technologies may be integrated into the same or different chip or set of chips and other components within network node 2460.

Processing circuitry 2470 is configured to perform any determining, calculating, or similar operations (e.g., certain obtaining operations) described herein as being provided by a network node. These operations performed by processing circuitry 2470 may include processing information obtained by processing circuitry 2470 by, for example, converting the obtained information into other information, comparing the obtained information or converted information to information stored in the network node, and/or performing one or more operations based on the obtained information or converted information, and as a result of said processing making a determination.

Processing circuitry 2470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2460 components, such as device readable medium 2480, network node 2460 functionality. For example, processing circuitry 2470 may execute instructions stored in device readable medium 2480 or in memory within processing circuitry 2470. Such functionality may include providing any of the various wireless features, functions, or benefits discussed herein. In some embodiments, processing circuitry 2470 may include a system on a chip (SOC).

In some embodiments, processing circuitry 2470 may include one or more of radio frequency (RF) transceiver circuitry 2472 and baseband processing circuitry 2474. In some embodiments, radio frequency (RF) transceiver circuitry 2472 and baseband processing circuitry 2474 may be on separate chips (or sets of chips), boards, or units, such as radio units and digital units. In alternative embodiments, part or all of RF transceiver circuitry 2472 and baseband processing circuitry 2474 may be on the same chip or set of chips, boards, or units In certain embodiments, some or all of the functionality described herein as being provided by a network node, base station, eNB or other such network device may be performed by processing circuitry 2470 executing instructions stored on device readable medium 2480 or memory within processing circuitry 2470. In alternative embodiments, some or all of the functionality may be provided by processing circuitry 2470 without executing instructions stored on a separate or discrete device readable medium, such as in a hard-wired manner. In any of those embodiments, whether executing instructions stored on a device readable storage medium or not, processing circuitry 2470 can be configured to perform the described functionality. The benefits provided by such functionality are not limited to processing circuitry 2470 alone or to other components of network node 2460, but are enjoyed by network node 2460 as a whole, and/or by end users and the wireless network generally.

Device readable medium 2480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2470. Device readable medium 2480 may store any suitable instructions, data or information, including a computer program, software, an application including one or more of logic, rules, code, tables, etc. and/or other instructions capable of being executed by processing circuitry 2470 and, utilized by network node 2460. Device readable medium 2480 may be used to store any calculations made by processing circuitry 2470 and/or any data received via interface 2490. In some embodiments, processing circuitry 2470 and device readable medium 2480 may be considered to be integrated.

Interface 2490 is used in the wired or wireless communication of signalling and/or data between network node 2460, network 2406, and/or WDs 2410. As illustrated, interface 2490 comprises port(s)/terminal(s) 2494 to send and receive data, for example to and from network 2406 over a wired connection. Interface 2490 also includes radio front end circuitry 2492 that may be coupled to, or in certain embodiments a part of, antenna 2462. Radio front end circuitry 2492 comprises filters 2498 and amplifiers 2496. Radio front end circuitry 2492 may be connected to antenna 2462 and processing circuitry 2470. Radio front end circuitry may be configured to condition signals communicated between antenna 2462 and processing circuitry 2470. Radio front end circuitry 2492 may receive digital data that is to be sent out to other network nodes or WDs via a wireless connection. Radio front end circuitry 2492 may convert the digital data into a radio signal having the appropriate channel and bandwidth parameters using a combination of filters 2498 and/or amplifiers 2496. The radio signal may then be transmitted via antenna 2462. Similarly, when receiving data, antenna 2462 may collect radio signals which are then converted into digital data by radio front end circuitry 2492. The digital data may be passed to processing circuitry 2470. In other embodiments, the interface may comprise different components and/or different combinations of components.

In certain alternative embodiments, network node 2460 may not include separate radio front end circuitry 2492, instead, processing circuitry 2470 may comprise radio front end circuitry and may be connected to antenna 2462 without separate radio front end circuitry 2492. Similarly, in some embodiments, all or some of RF transceiver circuitry 2472 may be considered a part of interface 2490. In still other embodiments, interface 2490 may include one or more ports or terminals 2494, radio front end circuitry 2492, and RF transceiver circuitry 2472, as part of a radio unit (not shown), and interface 2490 may communicate with baseband processing circuitry 2474, which is part of a digital unit (not shown).

Antenna 2462 may include one or more antennas, or antenna arrays, configured to send and/or receive wireless signals. Antenna 2462 may be coupled to radio front end circuitry 2490 and may be any type of antenna capable of transmitting and receiving data and/or signals wirelessly. In some embodiments, antenna 2462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2462 may be separate from network node 2460 and may be connectable to network node 2460 through an interface or port.

Antenna 2462, interface 2490, and/or processing circuitry 2470 may be configured to perform any receiving operations and/or certain obtaining operations described herein as being performed by a network node. Any information, data and/or signals may be received from a wireless device, another network node and/or any other network equipment. Similarly, antenna 2462, interface 2490, and/or processing circuitry 2470 may be configured to perform any transmitting operations described herein as being performed by a network node. Any information, data and/or signals may be transmitted to a wireless device, another network node and/or any other network equipment.

Power circuitry 2487 may comprise, or be coupled to, power management circuitry and is configured to supply the components of network node 2460 with power for performing the functionality described herein. Power circuitry 2487 may receive power from power source 2486. Power source 2486 and/or power circuitry 2487 may be configured to provide power to the various components of network node 2460 in a form suitable for the respective components (e.g., at a voltage and current level needed for each respective component). Power source 2486 may either be included in, or external to, power circuitry 2487 and/or network node 2460. For example, network node 2460 may be connectable to an external power source (e.g., an electricity outlet) via an input circuitry or interface such as an electrical cable, whereby the external power source supplies power to power circuitry 2487. As a further example, power source 2486 may comprise a source of power in the form of a battery or battery pack which is connected to, or integrated in, power circuitry 2487. The battery may provide backup power should the external power source fail. Other types of power sources, such as photovoltaic devices, may also be used.

Alternative embodiments of network node 2460 may include additional components beyond those shown in FIG. 24 that may be responsible for providing certain aspects of the network node's functionality, including any of the functionality described herein and/or any functionality necessary to support the subject matter described herein. For example, network node 2460 may include user interface equipment to allow input of information into network node 2460 and to allow output of information from network node 2460. This may allow a user to perform diagnostic, maintenance, repair, and other administrative functions for network node 2460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2410 includes antenna 2411, interface 2414, processing circuitry 2420, device readable medium 2430, user interface equipment 2432, auxiliary equipment 2434, power source 2436 and power circuitry 2437. WD 2410 may include multiple sets of one or more of the illustrated components for different wireless technologies supported by WD 2410, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 2410.

Antenna 2411 may include one or more antennas or antenna arrays, configured to send and/or receive wireless signals, and is connected to interface 2414. In certain alternative embodiments, antenna 2411 may be separate from WD 2410 and be connectable to WD 2410 through an interface or port. Antenna 2411, interface 2414, and/or processing circuitry 2420 may be configured to perform any receiving or transmitting operations described herein as being performed by a WD. Any information, data and/or signals may be received from a network node and/or another WD. In some embodiments, radio front end circuitry and/or antenna 2411 may be considered an interface.

As illustrated, interface 2414 comprises radio front end circuitry 2412 and antenna 2411. Radio front end circuitry 2412 comprise one or more filters 2418 and amplifiers 2416. Radio front end circuitry 2414 is connected to antenna 2411 and processing circuitry 2420, and is configured to condition signals communicated between antenna 2411 and processing circuitry 2420. Radio front end circuitry 2412 may be coupled to or a part of antenna 2411. In some embodiments, WD 2410 may not include separate radio front end circuitry 2412; rather, processing circuitry 2420 may comprise radio front end circuitry and may be connected to antenna 2411. Similarly, in some embodiments, some or all of RF transceiver circuitry 2422 may be considered a part of interface 2414. Radio front end circuitry 2412 may receive digital data that is to be sent out to other network nodes or WDs via a wireless connection. Radio front end circuitry 2412 may convert the digital data into a radio signal having the appropriate channel and bandwidth parameters using a combination of filters 2418 and/or amplifiers 2416. The radio signal may then be transmitted via antenna 2411. Similarly, when receiving data, antenna 2411 may collect radio signals which are then converted into digital data by radio front end circuitry 2412. The digital data may be passed to processing circuitry 2420. In other embodiments, the interface may comprise different components and/or different combinations of components.

Processing circuitry 2420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2410 components, such as device readable medium 2430, WD 2410 functionality. Such functionality may include providing any of the various wireless features or benefits discussed herein. For example, processing circuitry 2420 may execute instructions stored in device readable medium 2430 or in memory within processing circuitry 2420 to provide the functionality disclosed herein.

As illustrated, processing circuitry 2420 includes one or more of RF transceiver circuitry 2422, baseband processing circuitry 2424, and application processing circuitry 2426. In other embodiments, the processing circuitry may comprise different components and/or different combinations of components. In certain embodiments processing circuitry 2420 of WD 2410 may comprise a SOC. In some embodiments, RF transceiver circuitry 2422, baseband processing circuitry 2424, and application processing circuitry 2426 may be on separate chips or sets of chips. In alternative embodiments, part or all of baseband processing circuitry 2424 and application processing circuitry 2426 may be combined into one chip or set of chips, and RF transceiver circuitry 2422 may be on a separate chip or set of chips. In still alternative embodiments, part or all of RF transceiver circuitry 2422 and baseband processing circuitry 2424 may be on the same chip or set of chips, and application processing circuitry 2426 may be on a separate chip or set of chips. In yet other alternative embodiments, part or all of RF transceiver circuitry 2422, baseband processing circuitry 2424, and application processing circuitry 2426 may be combined in the same chip or set of chips. In some embodiments, RF transceiver circuitry 2422 may be a part of interface 2414. RF transceiver circuitry 2422 may condition RF signals for processing circuitry 2420.

In certain embodiments, some or all of the functionality described herein as being performed by a WD may be provided by processing circuitry 2420 executing instructions stored on device readable medium 2430, which in certain embodiments may be a computer-readable storage medium. In alternative embodiments, some or all of the functionality may be provided by processing circuitry 2420 without executing instructions stored on a separate or discrete device readable storage medium, such as in a hard-wired manner. In any of those particular embodiments, whether executing instructions stored on a device readable storage medium or not, processing circuitry 2420 can be configured to perform the described functionality. The benefits provided by such functionality are not limited to processing circuitry 2420 alone or to other components of WD 2410, but are enjoyed by WD 2410 as a whole, and/or by end users and the wireless network generally.

Processing circuitry 2420 may be configured to perform any determining, calculating, or similar operations (e.g., certain obtaining operations) described herein as being performed by a WD. These operations, as performed by processing circuitry 2420, may include processing information obtained by processing circuitry 2420 by, for example, converting the obtained information into other information, comparing the obtained information or converted information to information stored by WD 2410, and/or performing one or more operations based on the obtained information or converted information, and as a result of said processing making a determination.

Device readable medium 2430 may be operable to store a computer program, software, an application including one or more of logic, rules, code, tables, etc. and/or other instructions capable of being executed by processing circuitry 2420. Device readable medium 2430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2420. In some embodiments, processing circuitry 2420 and device readable medium 2430 may be considered to be integrated.

User interface equipment 2432 may provide components that allow for a human user to interact with WD 2410. Such interaction may be of many forms, such as visual, audial, tactile, etc. User interface equipment 2432 may be operable to produce output to the user and to allow the user to provide input to WD 2410. The type of interaction may vary depending on the type of user interface equipment 2432 installed in WD 2410. For example, if WD 2410 is a smart phone, the interaction may be via a touch screen; if WD 2410 is a smart meter, the interaction may be through a screen that provides usage (e.g., the number of gallons used) or a speaker that provides an audible alert (e.g., if smoke is detected). User interface equipment 2432 may include input interfaces, devices and circuits, and output interfaces, devices and circuits. User interface equipment 2432 is configured to allow input of information into WD 2410, and is connected to processing circuitry 2420 to allow processing circuitry 2420 to process the input information. User interface equipment 2432 may include, for example, a microphone, a proximity or other sensor, keys/buttons, a touch display, one or more cameras, a USB port, or other input circuitry. User interface equipment 2432 is also configured to allow output of information from WD 2410, and to allow processing circuitry 2420 to output information from WD 2410. User interface equipment 2432 may include, for example, a speaker, a display, vibrating circuitry, a USB port, a headphone interface, or other output circuitry. Using one or more input and output interfaces, devices, and circuits, of user interface equipment 2432, WD 2410 may communicate with end users and/or the wireless network, and allow them to benefit from the functionality described herein.

Auxiliary equipment 2434 is operable to provide more specific functionality which may not be generally performed by WDs. This may comprise specialized sensors for doing measurements for various purposes, interfaces for additional types of communication such as wired communications etc. The inclusion and type of components of auxiliary equipment 2434 may vary depending on the embodiment and/or scenario.

Power source 2436 may, in some embodiments, be in the form of a battery or battery pack. Other types of power sources, such as an external power source (e.g., an electricity outlet), photovoltaic devices or power cells, may also be used. WD 2410 may further comprise power circuitry 2437 for delivering power from power source 2436 to the various parts of WD 2410 which need power from power source 2436 to carry out any functionality described or indicated herein. Power circuitry 2437 may in certain embodiments comprise power management circuitry. Power circuitry 2437 may additionally or alternatively be operable to receive power from an external power source; in which case WD 2410 may be connectable to the external power source (such as an electricity outlet) via input circuitry or an interface such as an electrical power cable. Power circuitry 2437 may also in certain embodiments be operable to deliver power from an external power source to power source 2436. This may be, for example, for the charging of power source 2436. Power circuitry 2437 may perform any formatting, converting, or other modification to the power from power source 2436 to make the power suitable for the respective components of WD 2410 to which power is supplied.

Figure 25:
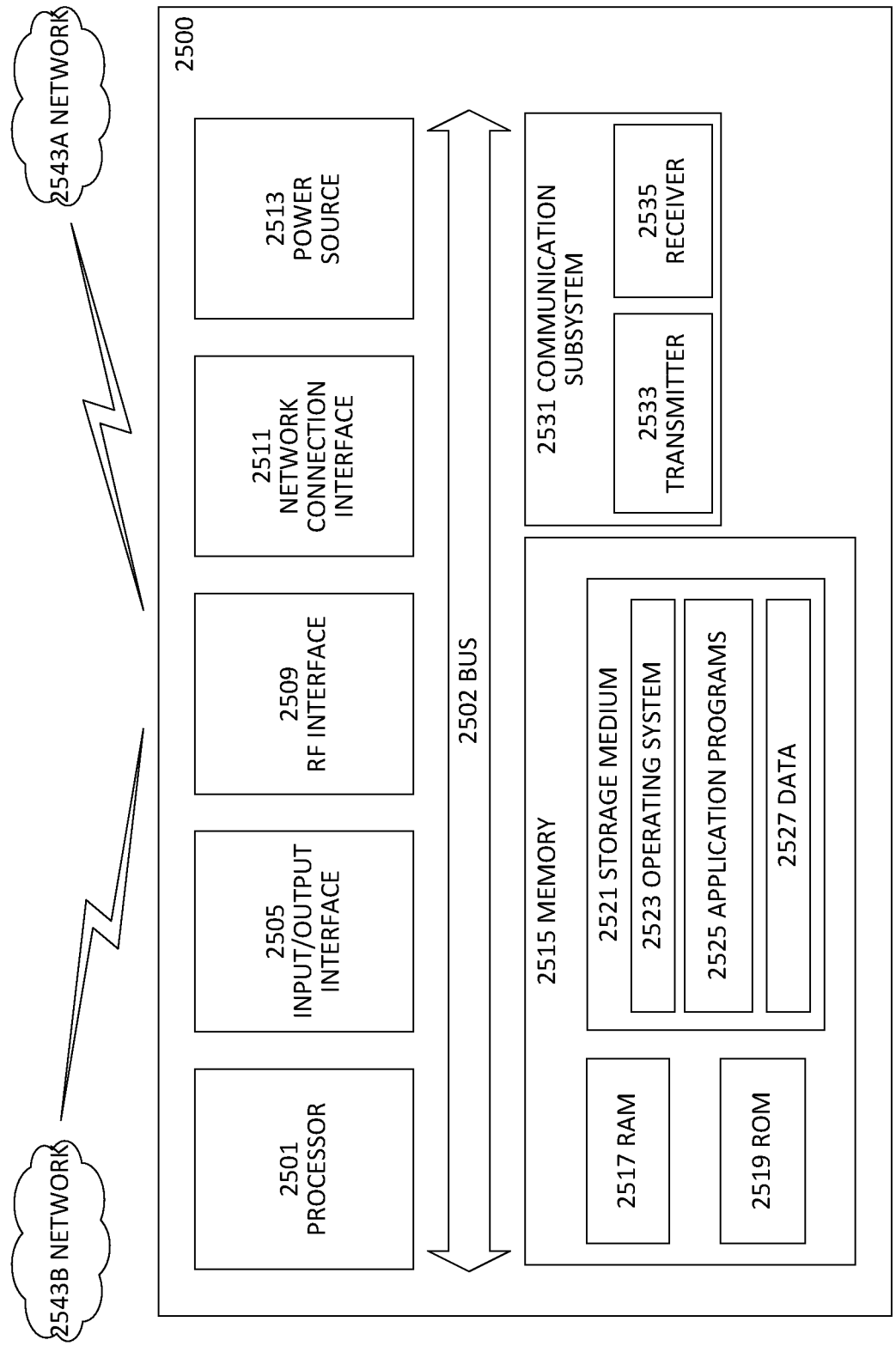
FIG. 25 is a block diagram of a user equipment according to some embodiments.

FIG. 25 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2500 may be any UE identified by the $3^{rd}$ Generation Partnership Project (3GPP), including a NB-IoT UE, a machine type communication (MTC) UE, and/or an enhanced MTC (eMTC) UE. UE 2500, as illustrated in FIG. 25, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 25 is a UE, the components discussed herein are equally applicable to a WD, and vice-versa.

In FIG. 25, UE 2500 includes processing circuitry 2501 that is operatively coupled to input/output interface 2505, radio frequency (RF) interface 2509, network connection interface 2511, memory 2515 including random access memory (RAM) 2517, read-only memory (ROM) 2519, and storage medium 2521 or the like, communication subsystem 2531, power source 2533, and/or any other component, or any combination thereof. Storage medium 2521 includes operating system 2523, application program 2525, and data 2527. In other embodiments, storage medium 2521 may include other similar types of information. Certain UEs may utilize all of the components shown in FIG. 25, or only a subset of the components. The level of integration between the components may vary from one UE to another UE. Further, certain UEs may contain multiple instances of a component, such as multiple processors, memories, transceivers, transmitters, receivers, etc.

In FIG. 25, processing circuitry 2501 may be configured to process computer instructions and data. Processing circuitry 2501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2501 may include two central processing units (CPUs). Data may be information in a form suitable for use by a computer.

In the depicted embodiment, input/output interface 2505 may be configured to provide a communication interface to an input device, output device, or input and output device. UE 2500 may be configured to use an output device via input/output interface 2505. An output device may use the same type of interface port as an input device. For example, a USB port may be used to provide input to and output from UE 2500. The output device may be a speaker, a sound card, a video card, a display, a monitor, a printer, an actuator, an emitter, a smartcard, another output device, or any combination thereof. UE 2500 may be configured to use an input device via input/output interface 2505 to allow a user to capture information into UE 2500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 25, RF interface 2509 may be configured to provide a communication interface to RF components such as a transmitter, a receiver, and an antenna. Network connection interface 2511 may be configured to provide a communication interface to network 2543a. Network 2543a may encompass wired and/or wireless networks such as a local-area network (LAN), a wide-area network (WAN), a computer network, a wireless network, a telecommunications network, another like network or any combination thereof. For example, network 2543a may comprise a Wi-Fi network. Network connection interface 2511 may be configured to include a receiver and a transmitter interface used to communicate with one or more other devices over a communication network according to one or more communication protocols, such as Ethernet, TCP/IP, SONET, ATM, or the like. Network connection interface 2511 may implement receiver and transmitter functionality appropriate to the communication network links (e.g., optical, electrical, and the like). The transmitter and receiver functions may share circuit components, software or firmware, or alternatively may be implemented separately.

RAM 2517 may be configured to interface via bus 2502 to processing circuitry 2501 to provide storage or caching of data or computer instructions during the execution of software programs such as the operating system, application programs, and device drivers. ROM 2519 may be configured to provide computer instructions or data to processing circuitry 2501. For example, ROM 2519 may be configured to store invariant low-level system code or data for basic system functions such as basic input and output (I/O), startup, or reception of keystrokes from a keyboard that are stored in a non-volatile memory. Storage medium 2521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2521 may be configured to include operating system 2523, application program 2525 such as a web browser application, a widget or gadget engine or another application, and data file 2527. Storage medium 2521 may store, for use by UE 2500, any of a variety of various operating systems or combinations of operating systems.

Storage medium 2521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2521 may allow UE 2500 to access computer-executable instructions, application programs or the like, stored on transitory or non-transitory memory media, to off-load data, or to upload data. An article of manufacture, such as one utilizing a communication system may be tangibly embodied in storage medium 2521, which may comprise a device readable medium.

In FIG. 25, processing circuitry 2501 may be configured to communicate with network 2543b using communication subsystem 2531. Network 2543a and network 2543b may be the same network or networks or different network or networks. Communication subsystem 2531 may be configured to include one or more transceivers used to communicate with network 2543b. For example, communication subsystem 2531 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 2533 and/or receiver 2535 to implement transmitter or receiver functionality, respectively, appropriate to the RAN links (e.g., frequency allocations and the like). Further, transmitter 2533 and receiver 2535 of each transceiver may share circuit components, software or firmware, or alternatively may be implemented separately.

In the illustrated embodiment, the communication functions of communication subsystem 2531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2531 may include cellular communication, Wi-Fi communication, Bluetooth communication, and GPS communication. Network 2543b may encompass wired and/or wireless networks such as a local-area network (LAN), a wide-area network (WAN), a computer network, a wireless network, a telecommunications network, another like network or any combination thereof. For example, network 2543b may be a cellular network, a Wi-Fi network, and/or a near-field network. Power source 2513 may be configured to provide alternating current (AC) or direct current (DC) power to components of UE 2500.

The features, benefits and/or functions described herein may be implemented in one of the components of UE 2500 or partitioned across multiple components of UE 2500. Further, the features, benefits, and/or functions described herein may be implemented in any combination of hardware, software or firmware. In one example, communication subsystem 2531 may be configured to include any of the components described herein. Further, processing circuitry 2501 may be configured to communicate with any of such components over bus 2502. In another example, any of such components may be represented by program instructions stored in memory that when executed by processing circuitry 2501 perform the corresponding functions described herein. In another example, the functionality of any of such components may be partitioned between processing circuitry 2501 and communication subsystem 2531. In another example, the non-computationally intensive functions of any of such components may be implemented in software or firmware and the computationally intensive functions may be implemented in hardware.

Figure 26:
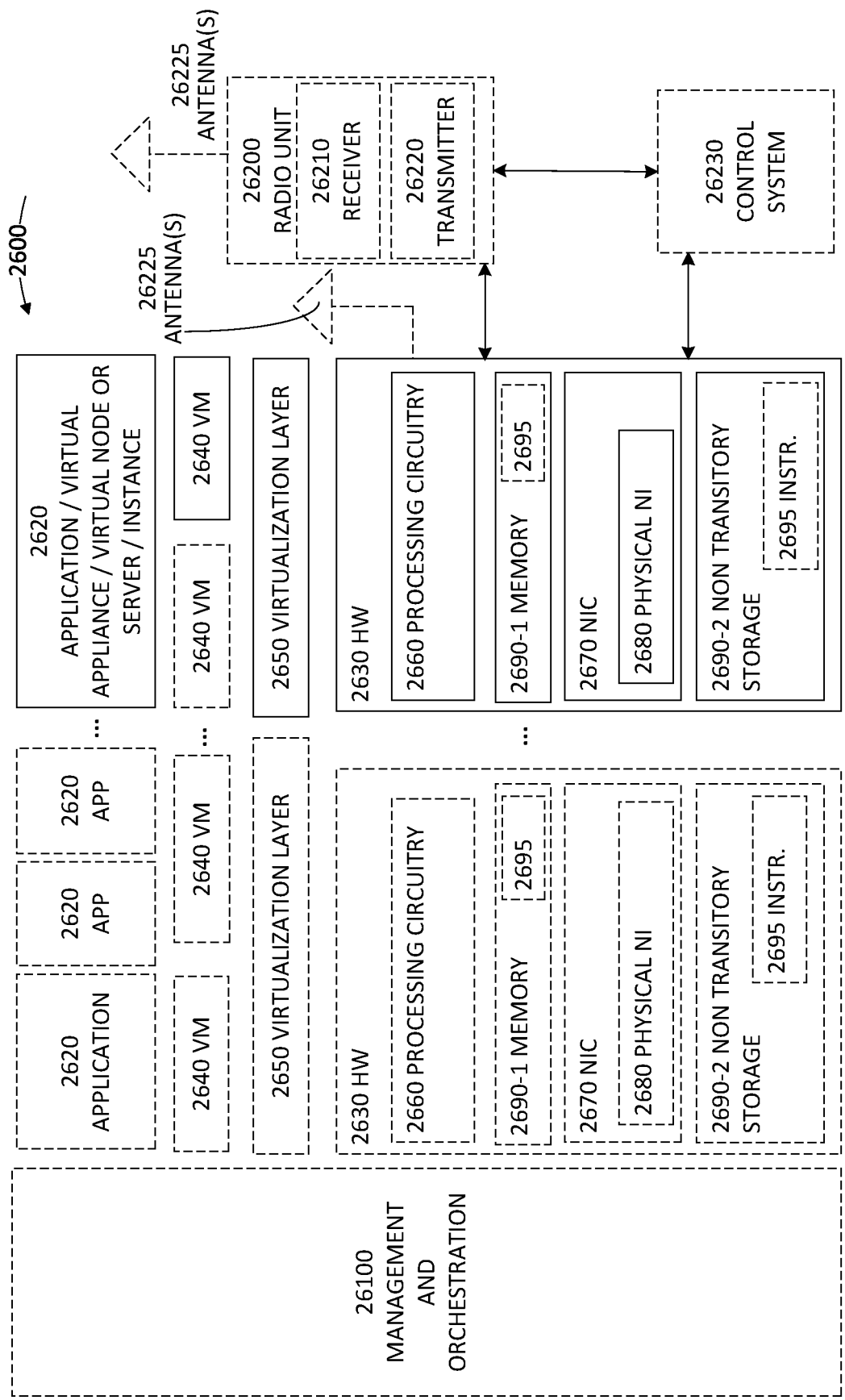
FIG. 26 is a block diagram of a virtualization environment according to some embodiments.

FIG. 26 is a schematic block diagram illustrating a virtualization environment 2600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2600 hosted by one or more of hardware nodes 2630. Further, in embodiments in which the virtual node is not a radio access node or does not require radio connectivity (e.g., a core network node), then the network node may be entirely virtualized.

The functions may be implemented by one or more applications 2620 (which may alternatively be called software instances, virtual appliances, network functions, virtual nodes, virtual network functions, etc.) operative to implement some of the features, functions, and/or benefits of some of the embodiments disclosed herein. Applications 2620 are run in virtualization environment 2600 which provides hardware 2630 comprising processing circuitry 2660 and memory 2690. Memory 2690 contains instructions 2695 executable by processing circuitry 2660 whereby application 2620 is operative to provide one or more of the features, benefits, and/or functions disclosed herein.

Virtualization environment 2600, comprises general-purpose or special-purpose network hardware devices 2630 comprising a set of one or more processors or processing circuitry 2660, which may be commercial off-the-shelf (COTS) processors, dedicated Application Specific Integrated Circuits (ASICs), or any other type of processing circuitry including digital or analog hardware components or special purpose processors. Each hardware device may comprise memory 2690-1 which may be non-persistent memory for temporarily storing instructions 2695 or software executed by processing circuitry 2660. Each hardware device may comprise one or more network interface controllers (NICs) 2670, also known as network interface cards, which include physical network interface 2680. Each hardware device may also include non-transitory, persistent, machine-readable storage media 2690-2 having stored therein software 2695 and/or instructions executable by processing circuitry 2660. Software 2695 may include any type of software including software for instantiating one or more virtualization layers 2650 (also referred to as hypervisors), software to execute virtual machines 2640 as well as software allowing it to execute functions, features and/or benefits described in relation with some embodiments described herein.

Virtual machines 2640, comprise virtual processing, virtual memory, virtual networking or interface and virtual storage, and may be run by a corresponding virtualization layer 2650 or hypervisor. Different embodiments of the instance of virtual appliance 2620 may be implemented on one or more of virtual machines 2640, and the implementations may be made in different ways.

During operation, processing circuitry 2660 executes software 2695 to instantiate the hypervisor or virtualization layer 2650, which may sometimes be referred to as a virtual machine monitor (VMM). Virtualization layer 2650 may present a virtual operating platform that appears like networking hardware to virtual machine 2640.

As shown in FIG. 26, hardware 2630 may be a standalone network node with generic or specific components. Hardware 2630 may comprise antenna 26225 and may implement some functions via virtualization. Alternatively, hardware 2630 may be part of a larger cluster of hardware (e.g. such as in a data center or customer premise equipment (CPE)) where many hardware nodes work together and are managed via management and orchestration (MANO) 26100, which, among others, oversees lifecycle management of applications 2620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2640 may be a software implementation of a physical machine that runs programs as if they were executing on a physical, non-virtualized machine. Each of virtual machines 2640, and that part of hardware 2630 that executes that virtual machine, be it hardware dedicated to that virtual machine and/or hardware shared by that virtual machine with others of the virtual machines 2640, forms a separate virtual network elements (VNE).

Still in the context of NFV, Virtual Network Function (VNF) is responsible for handling specific network functions that run in one or more virtual machines 2640 on top of hardware networking infrastructure 2630 and corresponds to application 2620 in FIG. 26.

In some embodiments, one or more radio units 26200 that each include one or more transmitters 26220 and one or more receivers 26210 may be coupled to one or more antennas 26225. Radio units 26200 may communicate directly with hardware nodes 2630 via one or more appropriate network interfaces and may be used in combination with the virtual components to provide a virtual node with radio capabilities, such as a radio access node or a base station.

In some embodiments, some signalling can be effected with the use of control system 26230 which may alternatively be used for communication between the hardware nodes 2630 and radio units 26200.

Figure 27:
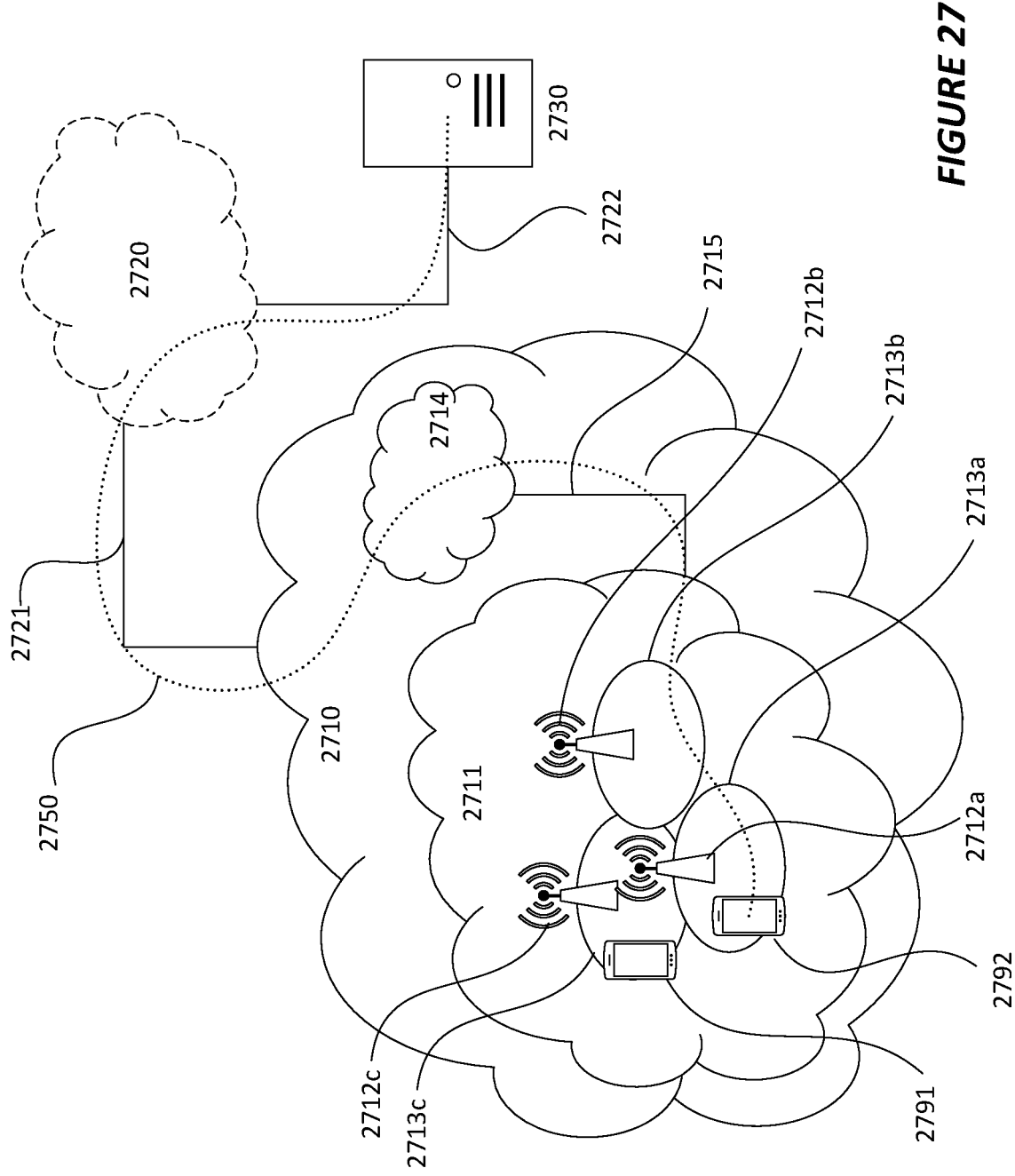
FIG. 27 is a block diagram of a communication network with a host computer according to some embodiments.

FIG. 27 illustrates a telecommunication network connected via an intermediate network to a host computer in accordance with some embodiments. In particular, with reference to FIG. 27, in accordance with an embodiment, a communication system includes telecommunication network 2710, such as a 3GPP-type cellular network, which comprises access network 2711, such as a radio access network, and core network 2714. Access network 2711 comprises a plurality of base stations 2712a, 2712b, 2712c, such as NBs, eNBs, gNBs or other types of wireless access points, each defining a corresponding coverage area 2713a, 2713b, 2713c. Each base station 2712a, 2712b, 2712c is connectable to core network 2714 over a wired or wireless connection 2715. A first UE 2791 located in coverage area 2713c is configured to wirelessly connect to, or be paged by, the corresponding base station 2712c. A second UE 2792 in coverage area 2713a is wirelessly connectable to the corresponding base station 2712a. While a plurality of UEs 2791, 2792 are illustrated in this example, the disclosed embodiments are equally applicable to a situation where a sole UE is in the coverage area or where a sole UE is connecting to the corresponding base station 2712.

Telecommunication network 2710 is itself connected to host computer 2730, which may be embodied in the hardware and/or software of a standalone server, a cloud-implemented server, a distributed server or as processing resources in a server farm. Host computer 2730 may be under the ownership or control of a service provider, or may be operated by the service provider or on behalf of the service provider. Connections 2721 and 2722 between telecommunication network 2710 and host computer 2730 may extend directly from core network 2714 to host computer 2730 or may go via an optional intermediate network 2720. Intermediate network 2720 may be one of, or a combination of more than one of, a public, private or hosted network; intermediate network 2720, if any, may be a backbone network or the Internet; in particular, intermediate network 2720 may comprise two or more sub-networks (not shown).

The communication system of FIG. 27 as a whole enables connectivity between the connected UEs 2791, 2792 and host computer 2730. The connectivity may be described as an over-the-top (OTT) connection 2750. Host computer 2730 and the connected UEs 2791, 2792 are configured to communicate data and/or signaling via OTT connection 2750, using access network 2711, core network 2714, any intermediate network 2720 and possible further infrastructure (not shown) as intermediaries. OTT connection 2750 may be transparent in the sense that the participating communication devices through which OTT connection 2750 passes are unaware of routing of uplink and downlink communications. For example, base station 2712 may not or need not be informed about the past routing of an incoming downlink communication with data originating from host computer 2730 to be forwarded (e.g., handed over) to a connected UE 2791. Similarly, base station 2712 need not be aware of the future routing of an outgoing uplink communication originating from the UE 2791 towards the host computer 2730.

Figure 28:
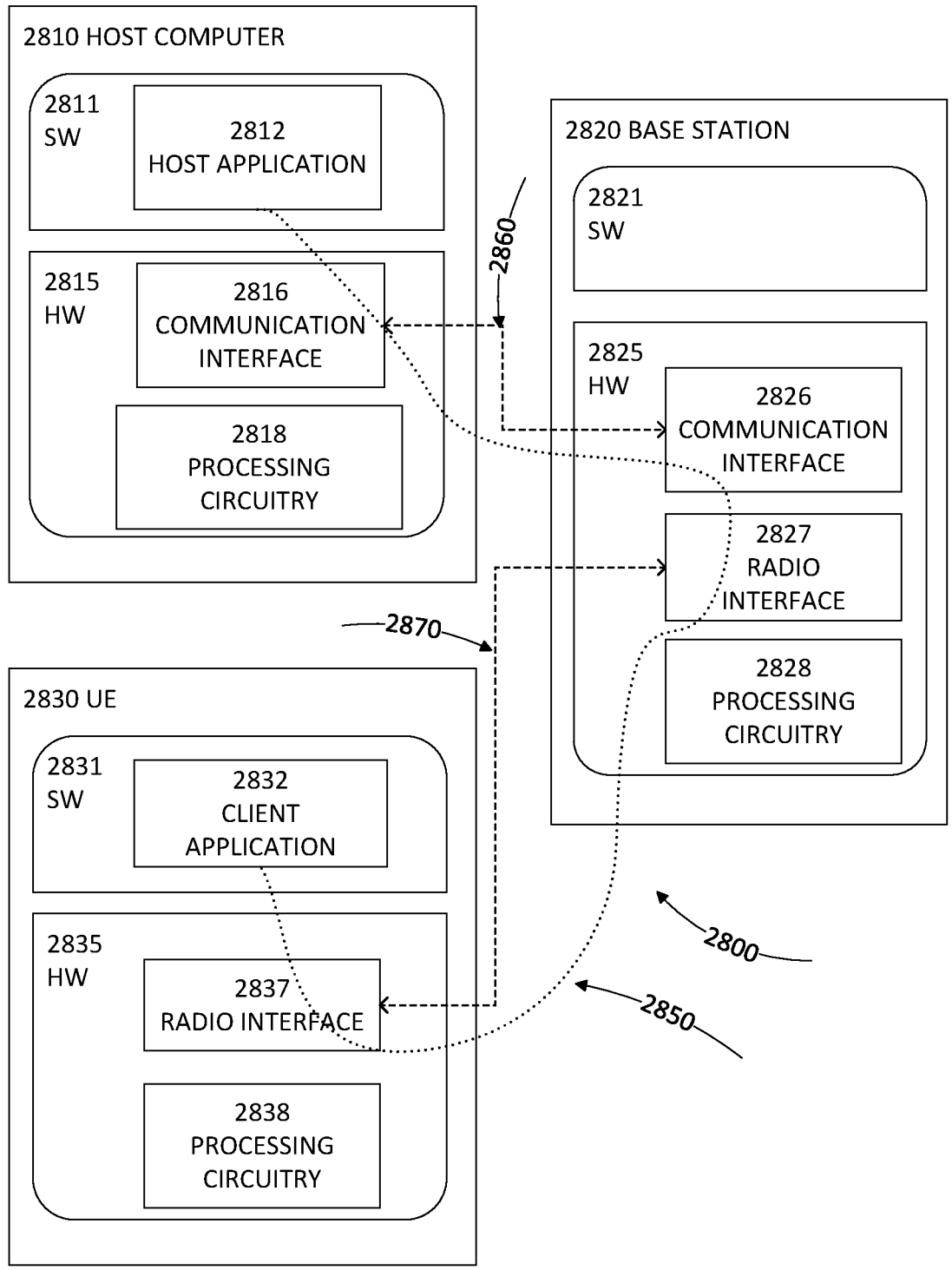
FIG. 28 is a block diagram of a host computer according to some embodiments.

Example implementations, in accordance with an embodiment, of the UE, base station and host computer discussed in the preceding paragraphs will now be described with reference to FIG. 28. FIG. 28 illustrates host computer communicating via a base station with a user equipment over a partially wireless connection in accordance with some embodiments In communication system 2800, host computer 2810 comprises hardware 2815 including communication interface 2816 configured to set up and maintain a wired or wireless connection with an interface of a different communication device of communication system 2800. Host computer 2810 further comprises processing circuitry 2818, which may have storage and/or processing capabilities. In particular, processing circuitry 2818 may comprise one or more programmable processors, application-specific integrated circuits, field programmable gate arrays or combinations of these (not shown) adapted to execute instructions. Host computer 2810 further comprises software 2811, which is stored in or accessible by host computer 2810 and executable by processing circuitry 2818. Software 2811 includes host application 2812. Host application 2812 may be operable to provide a service to a remote user, such as UE 2830 connecting via OTT connection 2850 terminating at UE 2830 and host computer 2810. In providing the service to the remote user, host application 2812 may provide user data which is transmitted using OTT connection 2850.

Communication system 2800 further includes base station 2820 provided in a telecommunication system and comprising hardware 2825 enabling it to communicate with host computer 2810 and with UE 2830. Hardware 2825 may include communication interface 2826 for setting up and maintaining a wired or wireless connection with an interface of a different communication device of communication system 2800, as well as radio interface 2827 for setting up and maintaining at least wireless connection 2870 with UE 2830 located in a coverage area (not shown in FIG. 28) served by base station 2820. Communication interface 2826 may be configured to facilitate connection 2860 to host computer 2810. Connection 2860 may be direct or it may pass through a core network (not shown in FIG. 28) of the telecommunication system and/or through one or more intermediate networks outside the telecommunication system. In the embodiment shown, hardware 2825 of base station 2820 further includes processing circuitry 2828, which may comprise one or more programmable processors, application-specific integrated circuits, field programmable gate arrays or combinations of these (not shown) adapted to execute instructions. Base station 2820 further has software 2821 stored internally or accessible via an external connection.

Communication system 2800 further includes UE 2830 already referred to. Its hardware 2835 may include radio interface 2837 configured to set up and maintain wireless connection 2870 with a base station serving a coverage area in which UE 2830 is currently located. Hardware 2835 of UE 2830 further includes processing circuitry 2838, which may comprise one or more programmable processors, application-specific integrated circuits, field programmable gate arrays or combinations of these (not shown) adapted to execute instructions. UE 2830 further comprises software 2831, which is stored in or accessible by UE 2830 and executable by processing circuitry 2838. Software 2831 includes client application 2832. Client application 2832 may be operable to provide a service to a human or non-human user via UE 2830, with the support of host computer 2810. In host computer 2810, an executing host application 2812 may communicate with the executing client application 2832 via OTT connection 2850 terminating at UE 2830 and host computer 2810. In providing the service to the user, client application 2832 may receive request data from host application 2812 and provide user data in response to the request data. OTT connection 2850 may transfer both the request data and the user data. Client application 2832 may interact with the user to generate the user data that it provides.

It is noted that host computer 2810, base station 2820 and UE 2830 illustrated in FIG. 28 may be similar or identical to host computer 2730, one of base stations 2712a, 2712b, 2712c and one of UEs 2791, 2792 of FIG. 27, respectively. This is to say, the inner workings of these entities may be as shown in FIG. 28 and independently, the surrounding network topology may be that of FIG. 27.

In FIG. 28, OTT connection 2850 has been drawn abstractly to illustrate the communication between host computer 2810 and UE 2830 via base station 2820, without explicit reference to any intermediary devices and the precise routing of messages via these devices. Network infrastructure may determine the routing, which it may be configured to hide from UE 2830 or from the service provider operating host computer 2810, or both. While OTT connection 2850 is active, the network infrastructure may further take decisions by which it dynamically changes the routing (e.g., on the basis of load balancing consideration or reconfiguration of the network).

Wireless connection 2870 between UE 2830 and base station 2820 is in accordance with the teachings of the embodiments described throughout this disclosure. One or more of the various embodiments improve the performance of OTT services provided to UE 2830 using OTT connection 2850, in which wireless connection 2870 forms the last segment.

A measurement procedure may be provided for the purpose of monitoring data rate, latency and other factors on which the one or more embodiments improve. There may further be an optional network functionality for reconfiguring OTT connection 2850 between host computer 2810 and UE 2830, in response to variations in the measurement results. The measurement procedure and/or the network functionality for reconfiguring OTT connection 2850 may be implemented in software 2811 and hardware 2815 of host computer 2810 or in software 2831 and hardware 2835 of UE 2830, or both. In embodiments, sensors (not shown) may be deployed in or in association with communication devices through which OTT connection 2850 passes; the sensors may participate in the measurement procedure by supplying values of the monitored quantities exemplified above, or supplying values of other physical quantities from which software 2811, 2831 may compute or estimate the monitored quantities. The reconfiguring of OTT connection 2850 may include message format, retransmission settings, preferred routing etc.; the reconfiguring need not affect base station 2820, and it may be unknown or imperceptible to base station 2820. Such procedures and functionalities may be known and practiced in the art. In certain embodiments, measurements may involve proprietary UE signaling facilitating host computer 2810's measurements of throughput, propagation times, latency and the like. The measurements may be implemented in that software 2811 and 2831 causes messages to be transmitted, in particular empty or 'dummy' messages, using OTT connection 2850 while it monitors propagation times, errors etc.

Figure 29:
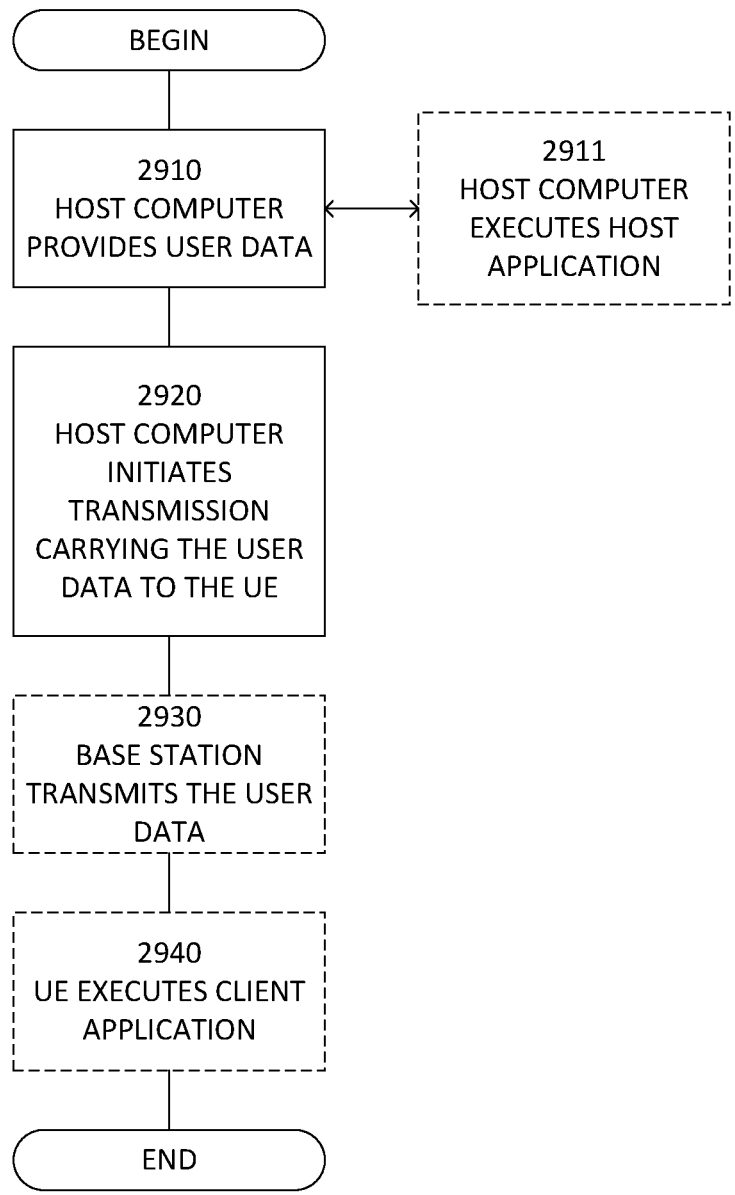
FIG. 29 is a flowchart illustrating a method implemented in a communication system, in accordance with one embodiment.

FIG. 29 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 29 will be included in this section. In step 2910, the host computer provides user data. In substep 2911 (which may be optional) of step 2910, the host computer provides the user data by executing a host application. In step 2920, the host computer initiates a transmission carrying the user data to the UE. In step 2930 (which may be optional), the base station transmits to the UE the user data which was carried in the transmission that the host computer initiated, in accordance with the teachings of the embodiments described throughout this disclosure. In step 2940 (which may also be optional), the UE executes a client application associated with the host application executed by the host computer.

Figure 30:
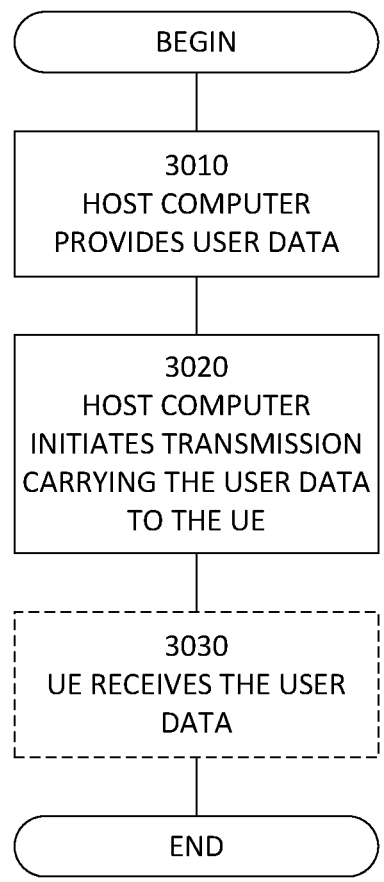
FIG. 30 is a flowchart illustrating a method implemented in a communication system, in accordance with one embodiment.

FIG. 30 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 30 will be included in this section. In step 3010 of the method, the host computer provides user data. In an optional substep (not shown) the host computer provides the user data by executing a host application. In step 3020, the host computer initiates a transmission carrying the user data to the UE. The transmission may pass via the base station, in accordance with the teachings of the embodiments described throughout this disclosure. In step 3030 (which may be optional), the UE receives the user data carried in the transmission.

Figure 31:
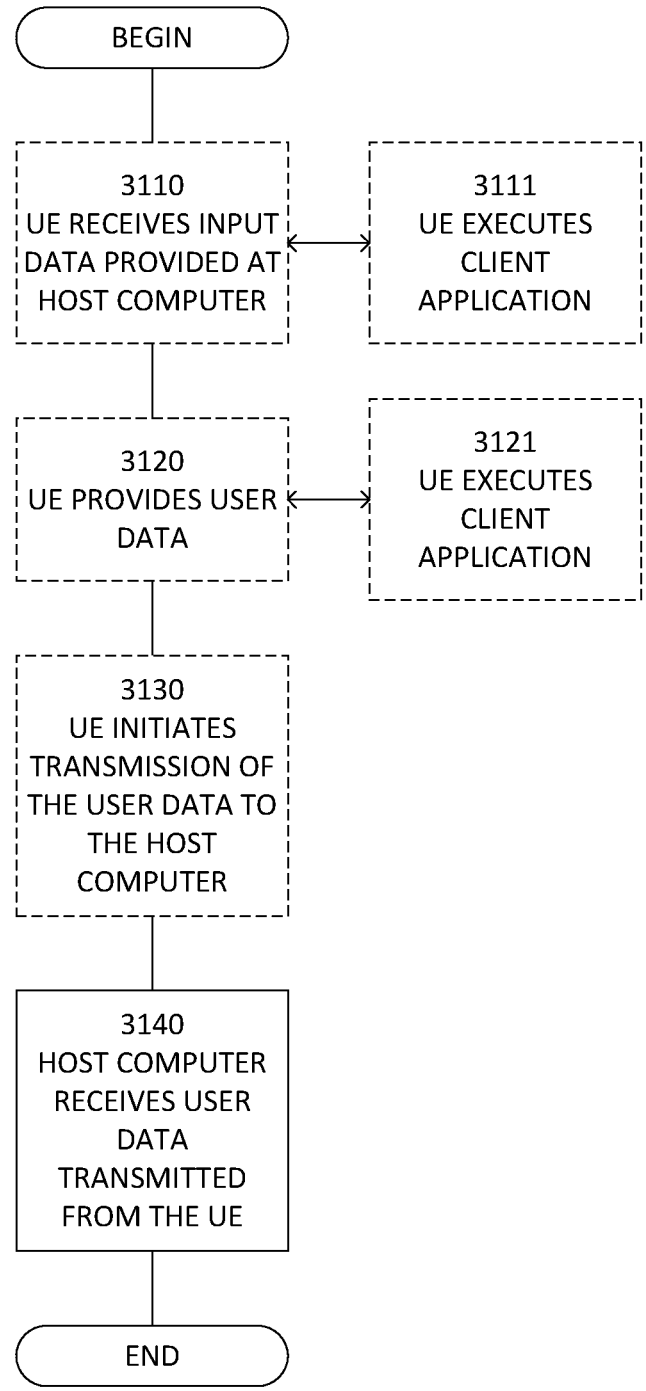
FIG. 31 is a flowchart illustrating a method implemented in a communication system, in accordance with one embodiment.

FIG. 31 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 31 will be included in this section. In step 3110 (which may be optional), the UE receives input data provided by the host computer. Additionally or alternatively, in step 3120, the UE provides user data. In substep 3121 (which may be optional) of step 3120, the UE provides the user data by executing a client application. In substep 3111 (which may be optional) of step 3110, the UE executes a client application which provides the user data in reaction to the received input data provided by the host computer. In providing the user data, the executed client application may further consider user input received from the user. Regardless of the specific manner in which the user data was provided, the UE initiates, in substep 3130 (which may be optional), transmission of the user data to the host computer. In step 3140 of the method, the host computer receives the user data transmitted from the UE, in accordance with the teachings of the embodiments described throughout this disclosure.

Figure 32:
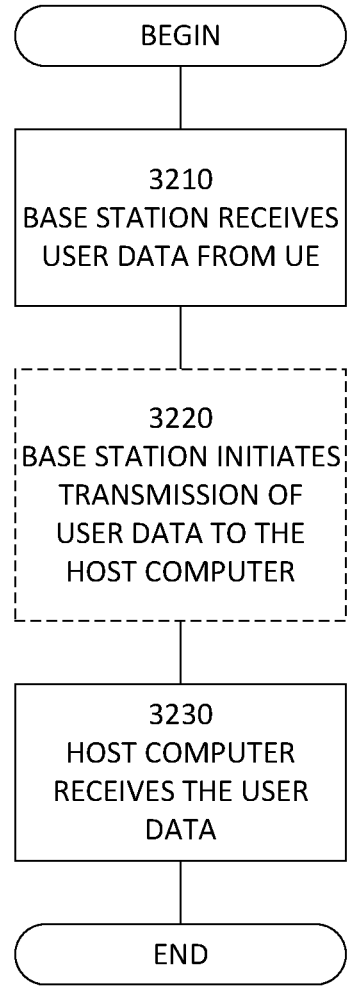
FIG. 32 is a flowchart illustrating a method implemented in a communication system, in accordance with one embodiment.

FIG. 32 is a flowchart illustrating a method implemented in a communication system, in accordance with one embodiment. The communication system includes a host computer, a base station and a UE which may be those described with reference to FIGS. 27 and 28. For simplicity of the present disclosure, only drawing references to FIG. 32 will be included in this section. In step 3210 (which may be optional), in accordance with the teachings of the embodiments described throughout this disclosure, the base station receives user data from the UE. In step 3220 (which may be optional), the base station initiates transmission of the received user data to the host computer. In step 3230 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device, the method comprising:
    detecting a master cell group (MCG) failure associated with a master cell group included in multiple cell groups that are respectively provided by multiple radio network nodes to which the wireless device simultaneously connects in multi-connectivity operation; and
    responsive to detecting the MCG failure, suspending monitoring of one or more trigger conditions whose fulfillment is to trigger execution of a conditional Primary Secondary Cell (PSCell) change (CPC) configuration stored at the wireless device, wherein the CPC configuration conditionally configures a change to a PSCell for said multi-connectivity operation, wherein said suspending comprises suspending monitoring of the one or more trigger conditions without the one or more trigger conditions having been fulfilled.

2. The method of claim 1, wherein a PSCell is a primary cell of a secondary cell group included in the multiple cell groups that are respectively provided by the multiple radio network nodes to which the wireless device simultaneously connects in said multi-connectivity operation.

3. The method of claim 1, wherein the MCG failure is detected upon either:
    detecting radio link failure for the master cell group;
    reconfiguration with sync failure of the master cell group;
    cell group configuration failure; or
    integrity check failure associated with the master cell group.

4. The method of claim 1, wherein said suspending responsive to detecting the failure comprises:
    responsive to detecting the MCG failure, initiating a procedure to report the MCG failure; and
    upon initiating the procedure to report the MCG failure, and without the one or more trigger conditions having been fulfilled, suspending monitoring of the one or more trigger conditions whose fulfillment is to trigger execution of the CPC configuration stored at the wireless device.

5. The method of claim 1, further comprising, responsive to detecting the MCG failure, keeping at least part of the CPC configuration stored at the wireless device, while monitoring of the one or more trigger conditions is suspended, unless and until the wireless device receives a command to release the CPC configuration.

6. The method of claim 1, further comprising:
    reporting the detected MCG failure;
    after reporting the detected MCG failure, receiving a message from a network node; and
    based on receipt of the message, resuming monitoring of the one or more trigger conditions whose fulfillment is to trigger execution of the CPC configuration stored at the wireless device.

7. The method of claim 6, wherein said resuming is performed if the message does not indicate the CPC configuration is to be released.

8. The method of claim 1, further comprising:
    reporting the detected MCG failure; and
    responsive to reporting the detected MCG failure, receiving delta signaling that configures the wireless device relative to the CPC configuration stored at the wireless device.

9. The method of claim 1, wherein said suspending comprises, without the one or more trigger conditions having been fulfilled, suspending monitoring of the one or more trigger conditions whose fulfillment is to trigger execution of the CPC configuration, while keeping at least part of the CPC configuration stored at the wireless device.

10. The method of claim 1, wherein said suspending comprises stopping performing actions related to CPC trigger condition monitoring.

11. The method of claim 1, wherein the multi-connectivity operation comprises multi-radio dual connectivity (MR-DC) operation, wherein the CPC configuration conditionally configures a change to a PSCell of a secondary cell group included in the multiple cell groups that are respectively provided by the multiple radio network nodes to which the wireless device simultaneously connects in said MR-DC operation, and wherein the method further comprises reporting the detected MCG failure to a master network node (MN), via a secondary network node (SN), wherein the wireless device simultaneously connects to the MN and the SN in the MR-DC operation.

12. A method performed by a secondary radio network node that provides a secondary cell group for a wireless device in multi-connectivity operation, the method comprising:
    configuring the wireless device with a conditional Primary Secondary Cell (PSCell) change (CPC) configuration that conditionally configures a change to a PSCell for said multi-connectivity operation;

after configuring the wireless device with the CPC configuration, receiving, from the wireless device, a report of a master cell group (MCG) failure associated with a master cell group in multi-connectivity operation; and after receiving the report, transferring, to a master radio network node that provides the master cell group for the wireless device in multi-connectivity operation, a context for the wireless device that includes the CPC configuration.

13. The method of claim 12, wherein a PSCell is a primary cell of the secondary cell group included in multiple cell groups that are respectively provided by the multiple radio network nodes to which the wireless device simultaneously connects in said multi-connectivity operation.

14. A method performed by a master radio network node that provides a master cell group for a wireless device in multi-connectivity operation, the method comprising:

receiving, from the wireless device that has a conditional Primary Secondary Cell (PSCell) change (CPC) configuration stored at the wireless device, a report of a master cell group (MCG) failure associated with a master cell group (MCG) in multi-connectivity operation; and after receiving the report, transmitting delta signaling to the wireless device that configures the wireless device relative to the CPC configuration.

15. A wireless device comprising:
communication circuitry; and
processing circuitry configured to:
  detect a master cell group (MCG) failure associated with a master cell group included in multiple cell groups that are respectively provided by multiple radio network nodes to which the wireless device simultaneously connects multi-connectivity operation; and
  responsive to detecting the MCG failure, suspend monitoring of one or more trigger conditions whose fulfillment is to trigger execution of a conditional Primary Secondary Cell (PSCell) change (CPC) configuration stored at the wireless device, wherein the CPC configuration conditionally configures a change to a PSCell for said multi-connectivity operation, wherein monitoring of the one or more trigger conditions is suspended without the one or more trigger conditions having been fulfilled.

16. The method of claim 14, wherein the delta signaling indicates the wireless device is to release the CPC configuration.

17. The method of claim 14, wherein the delta signaling indicates the wireless device is to modify the CPC configuration and/or add another CPC configuration, on an assumption that the wireless device kept at least part of the CPC configuration stored at the wireless device after reporting the MCG failure.

18. The method of claim 14, wherein the conditional PSCell change configuration conditionally configures a change to a PSCell for said multi-connectivity operation, wherein a PSCell is a primary cell of a secondary cell group included in multiple cell groups that are respectively provided by multiple radio network nodes to which the wireless device simultaneously connects in said multi-connectivity operation.

19. The wireless device of claim 15, wherein the multi-connectivity operation comprises multi-radio dual connectivity (MR-DC) operation, wherein the CPC configuration conditionally configures a change to a PSCell of a secondary cell group included in the multiple cell groups that are respectively provided by the multiple radio network nodes to which the wireless device simultaneously connects in said MR-DC operation, and wherein the processing circuitry is further configured to report the detected MCG failure to a master network node (MN), via a secondary network node (SN), wherein the wireless device is configured to simultaneously connect to the MN and the SN in the MR-DC operation.

20. The wireless device of claim 15, wherein a PSCell is a primary cell of a secondary cell group included in the multiple cell groups that are respectively provided by the multiple radio network nodes to which the wireless device simultaneously connects in said multi-connectivity operation.

21. The wireless device of claim 15, wherein the MCG failure is detected upon either:
detecting radio link failure for the master cell group;
reconfiguration with sync failure of the master cell group;
cell group configuration failure; or
integrity check failure associated with the master cell group.

22. The wireless device of claim 15, wherein the processing circuitry is configured to suspend monitoring of the one or more trigger conditions by:
responsive to detecting the MCG failure, initiating a procedure to report the MCG failure; and
upon initiating the procedure to report the MCG failure, and without the one or more trigger conditions having been fulfilled, suspending monitoring of the one or more trigger conditions whose fulfillment is to trigger execution of the CPC configuration stored at the wireless device.

23. The wireless device of claim 15, wherein the processing circuitry is configured to, responsive to detecting the MCG failure, keep at least part of the CPC configuration stored at the wireless device, while monitoring of the one or more trigger conditions is suspended, unless and until the wireless device receives a command to release the CPC configuration.

24. The wireless device of claim 15, wherein the processing circuitry is configured to:
report the detected MCG failure;
after reporting the detected MCG failure, receive a message from a network node; and
based on receipt of the message, resume monitoring of the one or more trigger conditions whose fulfillment is to trigger execution of the CPC configuration stored at the wireless device.

25. The wireless device of claim 24, wherein the processing circuitry is configured to resume monitoring of the one or more trigger conditions if the message does not indicate the CPC configuration is to be released.

26. The wireless device of claim 15, wherein the processing circuitry is configured to:
report the detected MCG failure; and
responsive to reporting the detected MCG failure, receive delta signaling that configures the wireless device relative to the CPC configuration stored at the wireless device.

27. A secondary radio network node configured to provide a secondary cell group for a wireless device in multi-connectivity operation, the secondary radio network node comprising:

communication circuitry; and
processing circuitry configured to:
- configure the wireless device with a conditional Primary Secondary Cell (PSCell) change (CPC) configuration that conditionally configures a change to a PSCell for said multi-connectivity operation;
- after configuring the wireless device with the CPC configuration, receive, from the wireless device, a report of a master cell group (MCG) failure associated with a master cell group in multi-connectivity operation; and
- after receiving the report, transfer, to a master radio network node that provides a master cell group for the wireless device in multi-connectivity operation, a context for the wireless device that includes the CPC configuration.

28. A master radio network node configured to provide a master cell group for a wireless device in multi-connectivity operation, the master radio network node comprising:
communication circuitry; and
processing circuitry configured to:
- receive, from the wireless device that has a conditional Primary Secondary Cell (PSCell) change (CPC) configuration stored at the wireless device, a report of a master cell group (MCG) failure associated with a master cell group in multi-connectivity operation; and
- after receiving the report, transmit delta signaling to the wireless device that configures the wireless device relative to the CPC configuration.

29. The master radio network node of claim 28, wherein the delta signaling indicates:
- the wireless device is to release the CPC configuration; or
- the wireless device is to modify the CPC configuration and/or add another CPC configuration, on an assumption that the wireless device kept at least part of the CPC configuration stored at the wireless device after reporting the MCG failure.

30. The master radio network node of claim 28, wherein the conditional PSCell change configuration conditionally configures a change to a PSCell for said multi-connectivity operation, wherein a PSCell is a primary cell of a secondary cell group included in multiple cell groups that are respectively provided by the multiple radio network nodes to which the wireless device simultaneously connects in said multi-connectivity operation.

* * * * *